(12) United States Patent
Gerster et al.

(10) Patent No.: US 8,252,862 B2
(45) Date of Patent: Aug. 28, 2012

(54) SILANE COUPLING AGENTS FOR FILLED RUBBERS

(75) Inventors: Michele Gerster, Binningen (CH); Manuel Mihalic, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/678,165

(22) PCT Filed: Sep. 5, 2008

(86) PCT No.: PCT/EP2008/061723
§ 371 (c)(1),
(2), (4) Date: Mar. 15, 2010

(87) PCT Pub. No.: WO2009/034016
PCT Pub. Date: Mar. 19, 2009

(65) Prior Publication Data
US 2010/0261826 A1    Oct. 14, 2010

(30) Foreign Application Priority Data
Sep. 13, 2007  (EP) ..................... 07116343

(51) Int. Cl.
*C08K 3/34* (2006.01)
*C08K 3/22* (2006.01)

(52) U.S. Cl. ........................ 524/493; 524/430

(58) Field of Classification Search .................... 524/493
See application file for complete search history.

(56) References Cited

U.S. PATENT DOCUMENTS

| | | | |
|---|---|---|---|
| 4,325,863 A | 4/1982 | Hinsken et al. | |
| 4,338,244 A | 7/1982 | Hinsken et al. | |
| 5,175,312 A | 12/1992 | Dubs et al. | |
| 5,216,052 A | 6/1993 | Nesvadba et al. | |
| 5,227,425 A | 7/1993 | Rauline | |
| 5,252,643 A | 10/1993 | Nesvadba | |
| 7,723,409 B2 * | 5/2010 | Fuso et al. ................... | 524/100 |
| 2002/0115767 A1 * | 8/2002 | Cruse et al. ................... | 524/262 |
| 2003/0144393 A1 | 7/2003 | Barruel et al. | |
| 2003/0199619 A1 * | 10/2003 | Cruse ............................. | 524/261 |
| 2009/0247683 A1 * | 10/2009 | Fukushima ................... | 524/430 |
| 2010/0317778 A1 * | 12/2010 | Gerster et al. ................. | 524/133 |

FOREIGN PATENT DOCUMENTS

| | | |
|---|---|---|
| DE | 1 173 898 | 7/1964 |
| DE | 43 16 611 | 11/1993 |
| DE | 43 16 622 | 11/1993 |
| DE | 43 16 876 | 11/1993 |
| EP | 0 589 839 | 3/1994 |
| EP | 0 591 102 | 4/1994 |
| EP | 0 735 088 | 10/1996 |
| EP | 0 810 258 | 12/1997 |
| EP | 1 291 384 | 3/2003 |
| FR | 2 803 301 | 7/2001 |
| WO | 02 48256 | 6/2002 |
| WO | 2005 059022 | 6/2005 |
| WO | 2006 065578 | 6/2006 |
| WO | 2007 039416 | 4/2007 |
| WO | WO 2007039416 A1 * | 4/2007 |
| WO | 2007 060934 | 5/2007 |
| WO | WO 2007060934 A1 * | 5/2007 |

* cited by examiner

*Primary Examiner* — Ling Choi
*Assistant Examiner* — Hui Chin
(74) *Attorney, Agent, or Firm* — Oblon, Spivak, McClelland, Maier & Neustadt, L.L.P.

(57) ABSTRACT

The invention describes a composition comprising a) a naturally occurring or synthetic rubber susceptible to oxidative, thermal, dynamic, light-induced and/or ozone-induced degradation, b) a white reinforcing filler, and c) as coupling agent, at least one compound of the formula I wherein the general symbols are as defined in claim 1, or an oligomeric hydrolysis product of the compound of the formula I.

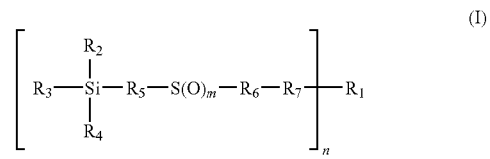

(I)

20 Claims, No Drawings

SILANE COUPLING AGENTS FOR FILLED RUBBERS

The present invention relates to compositions comprising a rubber susceptible to oxidative, thermal, dynamic, or light- and/or ozone-induced degradation, a white reinforcing filler, and as coupling agent at least a thio substituted silane or an oligomeric hydrolysis product thereof; to new coupling agents; and to a process for ensuring the coupling of a white reinforcing filler to rubber compositions reinforced by a white filler, which comprises incorporating into the rubber at least a thio substituted silane or an oligomeric hydrolysis product thereof and vulcanizing the composition. The present invention relates also to a process for the manufacture of a filled rubber compound with improved processability (decrease of Mooney viscosity) which comprises mixing in one-step (a) a rubber, (b) a white reinforcing filler, and (c) as coupling agent at least a thio substituted silane or an oligomeric hydrolysis product thereof.

The tire industry has experienced a milestone development in the late nineties with the discovery by the European tire manufacturer Michelin of the beneficial use of silica as reinforcing white filler in tread tires [see e.g. U.S. Pat. No. 5,227,425]. Indeed, tires with silica-filled tread formulations offer performance advantages over those based on conventional carbon black filler. They also show an improved balance between rolling resistance (reduced fuel consumption) and abrasion resistance versus wet grip (improved driving safety on wet roads).

Because particle surfaces of precipitated silica have hydrophilic silanol groups, which results in strong filler-filler interaction through hydrogen bonds, their affinity to the unpolar rubber matrix is limited and their dispersion in rubber compounds is much worse than of carbon black. In order to improve the compatibility of silica in rubber and ensure its good dispersion within the polymer matrix and to improve the reinforcement effect, coupling agents are necessary to be used.

Silane-based coupling agents used in the rubber industry are usually bifunctional organosilanes, such as bis(3-triethoxysilylpropyl)tetrasulfide (TESPT; or Si 69 from Evonik), bis(3-triethoxysilylpropyl)disulfide (TESPD; or Si 75 from Evonik. Typically, these bis-organosilanes are used to enhance the rubber reinforcement characteristics of silica by reacting with both the silica surface and the rubber molecules. The critical part of these systems is to maintain control for these two reactions to occur when desired and not before. It is indeed well known that TESPT, with its heat-sensitive tetrasulfide moiety, is a scorchy compound which can induce premature vulcanisation (pre-scorch) if a well controlled complicated multi-step mixing process is not applied. With TESPD, which has a more stable two sulfur atoms bridge in the silane, the premature crosslinking of the rubber and/or the pre-coupling of the coupling agent to the rubber also tends to occur but at higher mixing temperatures or at longer times at a lower temperature. The premature curing (pre-scorch) and/or the pre-coupling of the coupling agent to the rubber are not desirable during rubber processing but cannot totally be avoided with the state-of-the-art coupling agents unless cumbersome multi-step mixing process are applied. Therefore there is a need to develop coupling agents with higher processing safety so that the disadvantageous multi-step mixing process could be simplified and reduced mix times or fewer mix passes applied.

WO-A-2005/059022 and WO-A-2007/039416 disclose coupling agents for silica in rubber.

The known coupling agents for mineral filled elastomers do not satisfy in every respect the high requirements which a coupling agent is required to meet, especially with regard to the final mechanical properties of the elastomer such as for example elongation at break, modulus, compression set, hardness, resistance to abrasion and the dynamic mechanical properties (heat build-up, tan δ upon temperature). Furthermore, good processing safety during the mixing of the rubber with the filler and the coupling agent is also highly sought.

It has now been found that a specific group of thio substituted silanes or oligomeric hydrolysis products thereof are particularly suitable as coupling agents for ensuring the coupling of a white reinforcing filler with a rubber. These coupling agents with their enlarged processing window and high thermal stability can be mixed in a one-step process and/or at higher temperature which advantageously helps shorten processing time and/or decrease of VOC emission without undesirable premature coupling to the rubber.

The present invention therefore provides compositions comprising
a) a naturally occurring or synthetic rubber susceptible to oxidative, thermal, dynamic, light-induced and/or ozone-induced degradation,
b) a white reinforcing filler, and
c) a coupling agent of the formula I $$\left[ R_3 - \underset{\underset{R_4}{|}}{\overset{\overset{R_2}{|}}{Si}} - R_5 - S(O)_m - R_6 - R_7 \right]_n R_1,$$ (I)

wherein, when n is 1,
$R_1$ is hydrogen, $C_1$-$C_{25}$alkyl, $C_1$-$C_{25}$alkyl substituted with furyl, morpholine, $C_1$-$C_4$dialkylamino, $C_1$-$C_4$trialkylammonium or $M^+$ $^-O_3S$—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl; unsubstituted or with halogen, nitro, $C_1$-$C_4$alkyl or $C_1$-$C_4$alkoxy substituted $C_7$-$C_{15}$arylalkyl; $C_7$-$C_{12}$-phenoxyalkyl, unsubstituted or $C_1$-$C_4$alkyl substituted $C_7$-$C_9$bicycloalkyl;

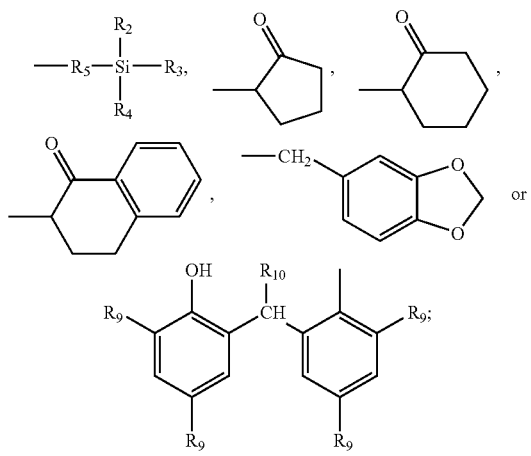

or when $R_7$ is a direct bond, $R_1$ is —CN, —SOR$_8$, —SO$_2$R$_8$, —NO$_2$ or —COR$_8$;

when n is 2, $R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

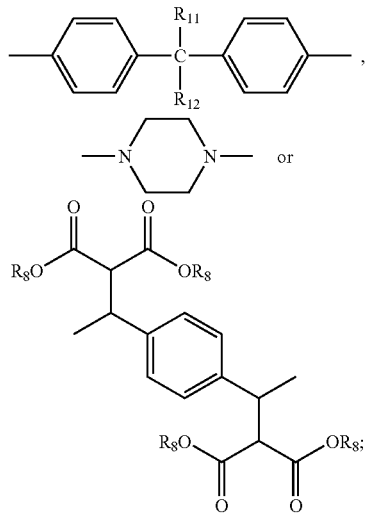

or when $R_6$ and $R_7$ are a direct bond, $R_1$ is

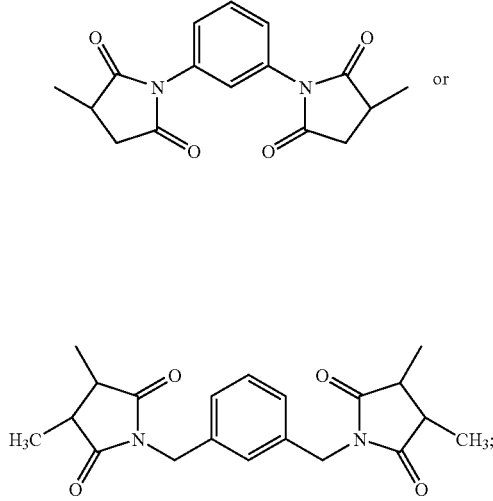

$R_2$, $R_3$ and $R_4$ are each independently of the others $C_1$-$C_{25}$alkyl, $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl, $C_7$-$C_9$-phenylalkyl, $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$phenylalkoxy, halogen, $C_2$-$C_{25}$alkanoyloxy or unsubstituted or $C_1$-$C_4$alkyl substituted benzoyloxy; or at least two of $R_2$, $R_3$ and $R_4$ are —O—$R_{15}$—O—; or $R_2$ is additionally

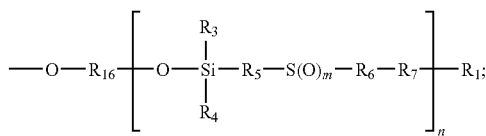

or $R_3$ is additionally

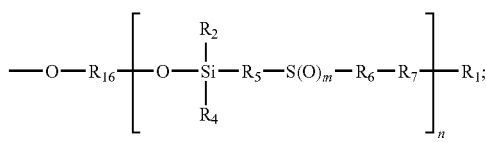

or $R_4$ is additionally

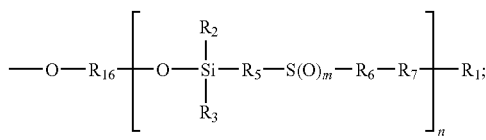

with the proviso that at least one of $R_2$, $R_3$ or $R_4$ is $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$-phenylalkoxy, halogen, $C_2$-$C_{25}$alkanoyloxy or unsubstituted or $C_1$-$C_4$alkyl substituted benzoyloxy;

$R_5$ is $C_1$-$C_{25}$alkylene, $C_5$-$C_{12}$cycloalkylene, unsubstituted or $C_1$-$C_4$alkyl substituted phenylene;

$R_6$ is

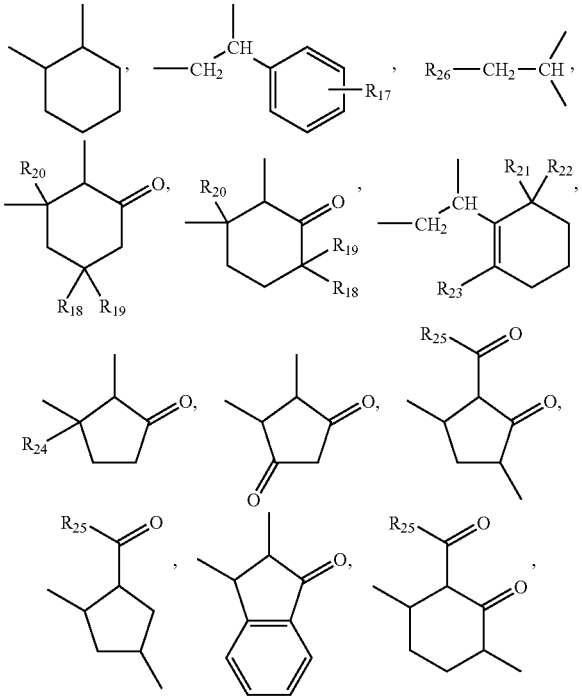

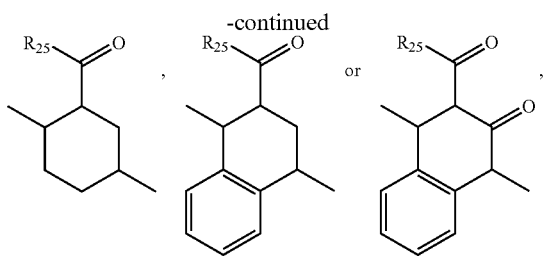, 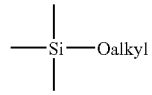

wherein the methylene group is always attached to $R_7$, $R_7$ is a direct bond or

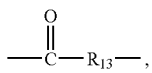

$R_8$ is $C_1$-$C_{25}$alkyl, $C_2$-$C_{25}$alkyl interrupted by oxygen; $C_5$-$C_{12}$cycloalkyl, $C_2$-$C_{25}$alkenyl, $C_2$-$C_{25}$alkinyl, $C_7$-$C_9$-phenylalkyl, unsubstituted or $C_1$-$C_4$alkyl-substituted phenyl, $R_9$ is $C_1$-$C_5$alkyl, $R_{10}$ is hydrogen or $C_1$-$C_4$alkyl, $R_{11}$ and $R_{12}$ are each independently of the other hydrogen, $CF_3$, $C_1$-$C_{12}$alkyl or phenyl, or $R_{11}$ and $R_{12}$, together with the carbon atom to which they are bonded, form a $C_5$-$C_8$cycloalkylidene ring that is unsubstituted or substituted by from 1 to 3 $C_1$-$C_4$alkyl groups, $R_{13}$ is a direct bond, oxygen or —$N(R_{14})$—, $R_{14}$ is hydrogen or $C_1$-$C_{12}$alkyl, $R_{15}$ is $C_1$-$C_{25}$alkylene or $C_1$-$C_{25}$alkylene substituted with $C_1$-$C_{25}$alkyl;

$R_{16}$ is $C_1$-$C_{25}$alkylene or $C_1$-$C_{25}$alkylene substituted with $C_1$-$C_{25}$alkyl;

$R_{17}$ is hydrogen, halogen, nitro or $C_1$-$C_4$alkoxy, $R_{18}$ and $R_{19}$ are each independently of the other hydrogen, $C_1$-$C_{12}$alkyl, $C_3$-$C_{12}$alkenyl or phenyl, $R_{20}$ is hydrogen or $C_1$-$C_4$alkyl, $R_{21}$, $R_{22}$ and $R_{23}$ are each independently of the other hydrogen or $C_1$-$C_4$alkyl, $R_{24}$ is hydrogen or $C_1$-$C_4$alkyl, $R_{25}$ is $C_1$-$C_{12}$alkyl, $R_{26}$ is hydrogen or $C_1$-$C_{12}$alkyl, M is sodium, potassium or ammonium, m is 0, 1 or 2; and n is 1 or 2; or an oligomeric hydrolysis product of the compound of the formula I.

Oligomeric hydrolysis products of the compounds of the formula I are those in which at least one of the radicals at the silicium atom ($R_2$, $R_3$ or $R_4$) is replaced by an OH group.

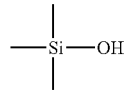

groups can then easily condensate with, for example, another

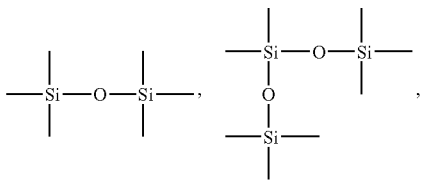

group to form oligomeric compounds. Such condensates or oligomeric hydrolysis products are therefore for example

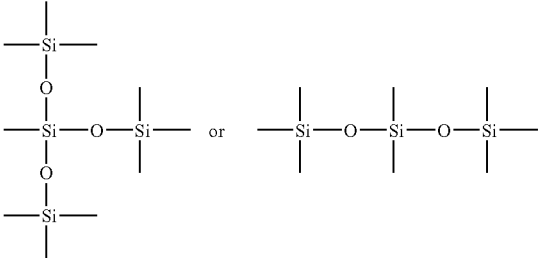

Alkyl having up to 25 carbon atoms is a branched or unbranched radical, such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl or eicosyl.

$C_1$-$C_{25}$Alkyl substituted with furyl, morpholine, $C_1$-$C_4$dialkylamino, $C_1$-$C_4$trialkylammonium or $M^+$ $^-O_3S$— is a branched or unbranched radical, such as furylmethyl, furylethyl, furylpropyl, 2,4-difuryl-hexyl, N-morpholinylethyl, N-morpholinylbutyl, N-morphlinylhexyl, 3-dimethylaminopropyl, 4-dimethylaminobutyl, 5-dimethylaminopentyl, 6-diethylaminohexyl, trimethylammoniumpropyl or potassium sulfoxylpropyl.

$C_2$-$C_{18}$Alkyl interrupted by oxygen is, for example, $CH_3$—O—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

Alkenyl having 2 to 25 carbon atoms is a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl.

$C_1$-$C_4$Alkyl-substituted phenyl, which contains preferably from 1 to 3, especially 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_7$-$C_{12}$-Phenoxyalkyl is, for example, phenoxymethyl, phenoxyethyl, phenoxypropyl, phenoxybutyl, phenoxypentyl, or phenoxyhexyl.

$C_7$-$C_8$Bicycloalkylene is, for example, bicycloheptylene or bicyclooctylene.

$C_1$-$C_4$Alkyl substituted $C_7$-$C_9$bicycloalkyl is, for example,

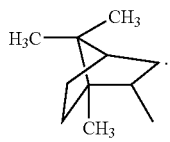

$C_1$-$C_{25}$Alkylene or $C_1$-$C_{25}$alkylene substituted with $C_1$-$C_4$alkyl containing preferably from 1 to 3, especially 1 or 2, branched or unbranched alkyl group radicals, is a branched or unbranched radical, for example methylene, ethylene, propylene, trimethylene, tetramethylene, pentamethylene, hexamethylene, heptamethylene, octamethylene, decamethylene, dodecamethylene, octadecamethylene, 1-methylethylene or 2-methylethylene.

$C_2$-$C_{25}$Alkylene substituted with $C_1$-$C_4$alkyl and interrupted by oxygen is, for example, —$CH_2CH_2$—O—$CH_2C(CH_3)_2CH_2$—O—$CH_2CH_2$—.

$C_2$-$C_{25}$Alkylene interrupted by oxygen, sulfur, phenylene or cyclohexylene is, for example, —$CH_2$—O—$CH_2$—, —$CH_2CH_2$—O—$CH_2CH_2$—, —$CH_2CH_2$—S—$CH_2CH_2$—, —$CH_2$—O—$CH_2CH_2$—O—$CH_2$—, —$CH_2CH_2$—O—$CH_2CH_2$—O—$CH_2CH_2$—, —$CH_2$—(O—$CH_2CH_2$—)$_2$O—$CH_2$—, —$CH_2CH_2$—(O—$CH_2CH_2$—)$_2$O—$CH_2CH_2$—, —$CH_2$—(O—$CH_2CH_2$—)$_3$O—$CH_2$—, —$CH_2$—(O—$CH_2CH_2$—)$_4$O—$CH_2$—, —$CH_2CH_2$—(O—$CH_2CH_2$—)$_4$O—$CH_2CH_2$—, —$CH_2CH_2$—O—$CH_2C(CH_3)_2CH_2$—O—$CH_2CH_2$—

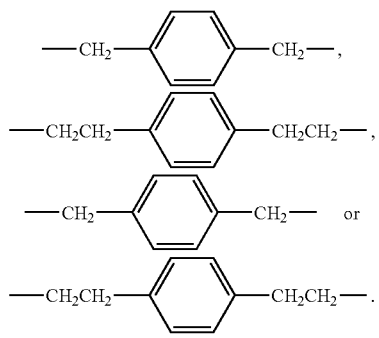

$C_5$-$C_{12}$Cycloalkyl is, for example, cyclopentyl, cyclohexyl, cycloheptyl or cyclooctyl. Preference is given to cyclohexyl.

$C_7$-$C_9$-Phenylalkyl is, for example, benzyl, α-methylbenzyl, α,α-dimethylbenzyl or 2-phenylethyl.

Alkoxy containing up to 25 carbon atoms is a branched or unbranched radical, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy.

$C_3$-$C_{25}$Alkoxy interrupted by oxygen is, for example, $CH_3$—O—$CH_2CH_2O$—, $CH_3$—O—$CH_2CH_2$—O—$CH_2CH_2O$—, $CH_3$—(O—$CH_2CH_2$—)$_2$O—$CH_2CH_2O$—, $CH_3$—(O—$CH_2CH_2$—)$_3$O—$CH_2CH_2O$— or $CH_3$—(O—$CH_2CH_2$—)$_4$O—$CH_2CH_2O$—.

$C_5$-$C_{12}$Cycloalkoxy is, for example, cyclopentyloxy, cyclohexyloxy, cycloheptyloxy, cyclooctyloxy, cyclononyloxy, cyclodecyloxy, cycloundecyloxy or cyclododecyloxy. Preference is given to cyclohexyloxy.

Alkenyloxy containing from 2 to 25 carbon atoms is a branched or unbranched radical, for example vinyloxy, propenyloxy, 2-butenyloxy, 3-butenyloxy, isobutenyloxy, n-2,4-pentadienyloxy, 3-methyl-2-butenyloxy, n-2-octenyloxy, n-2-dodecenyloxy, isododecenyloxy, oleyloxy, n-2-octadecenyloxy or n-4-octadecenyloxy.

$C_1$-$C_4$Alkyl-substituted phenoxy, which contains preferably from 1 to 3, especially 1 or 2, alkyl groups, is, for example, o-, m- or p-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-methyl-6-ethylphenoxy, 4-tert-butylphenoxy, 2-ethylphenoxy or 2,6-diethylphenoxy.

$C_7$-$C_9$-Phenylalkoxy is, for example, benzyloxy, α-methylbenzyloxy, α,α-dimethylbenzyloxy or 2-phenylethoxy.

Halogen is, for example, chlorine, bromine or iodine. Preference is given to chlorine.

Alkanoyloxy containing from 2 to 25 carbon atoms is a branched or unbranched radical, for example acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy.

$C_1$-$C_4$Alkyl substituted benzoyloxy which contains preferably from 1 to 3, especially 1 or 2, alkyl groups, is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethylbenzoyloxy, 3,5-dimethylbenzoyloxy, 2-methyl-6-ethylbenzoyloxy, 4-tert-butylbenzoyloxy, 2-ethylbenzoyloxy or 2,6-diethylbenzoyloxy.

$C_1$-$C_4$Alkyl substituted phenylene which contains preferably from 1 to 3, especially 1 or 2, alkyl groups, is, for example, 2-methylphenylene, 2-ethylphenylene, 2-propylphenylene, 2-butylenephenylene, 2,6-dimethylphenylene, 2,5-dimethylphenylene or 2,3-dimethylphenylene.

$C_1$-$C_{25}$Alkylene substituted with $C_1$-$C_{25}$alkyl, $C_2$-$C_{25}$alkoxycarbonyl or phenyl is a branched or unbranched radical, for example —$CH_2(COOCH_3)$—, —$CH_2(COOCH_2CH_3)$—, 2-methylethylene or 2-phenylethylene.

Alkinyl having 2 to 25 carbon atoms is a branched or unbranched radical such as, for example, acetylyl, propargyl, 2-butinyl, 3-butinyl, isobutinyl, n-2,4-pentadiinyl, 3-methyl-2-butinyl, n-2-octinyl, n-2-dodecinyl, iso-dodecinyl, n-2-octadecinyl or n-4-octadecinyl.

$C_5$-$C_{12}$cycloalkylene is for example cyclopentylene, cyclohexylene, cycloheptylene, cyclooctylene, cyclononylene, cyclodecylene, cycloundecylene or cyclododecylene. Cyclohexylene is preferred.

A $C_5$-$C_8$cycloalkylidene ring substituted by $C_1$-$C_4$alkyl, which contains preferably from 1 to 3, especially 1 or 2, branched or unbranched alkyl group radicals, is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cycloheptylidene or cyclooctylidene. Preference is given to cyclohexylidene and tert-butylcyclohexylidene.

Unsubstituted or with halogen, nitro, $C_1$-$C_4$alkyl or $C_1$-$C_4$alkoxy substituted $C_7$-$C_{15}$arylalkyl which contains preferably from 1 to 3, especially 1 or 2, substituents, is, for example, benzyl, p-chlorbenzyl, 3,4-dimethoxybenzyl, p-bromobenzyl, 2-naphthyl benzyl, 3-nitrobenzyl, 4-isopropylbenzyl, 4-methoxybenzyl, 1-naphthylbenzyl or anthracylmethyl.

Interesting compositions comprise, as component (c), at least a compound of the formula I, wherein, when n is 1, $R_1$ is hydrogen, $C_1$-$C_{18}$alkyl, $C_1$-$C_{18}$alkyl substituted with furyl, morpholine, $C_1$-$C_4$dialkylamino, $C_1$-$C_4$trialkylammonium or $M^+$ $^-O_3S$—; $C_2$-$C_{18}$alkyl interrupted by oxygen; $C_5$-$C_8$cycloalkyl, $C_2$-$C_{18}$alkenyl, unsubstituted or $C_1$-$C_4$alkyl-substituted phenyl; unsubstituted or with halogen, nitro, $C_1$-$C_4$alkyl or $C_1$-$C_4$alkoxy substituted $C_7$-$C_{15}$arylalkyl; $C_7$-$C_{12}$phenoxyalkyl, unsubstituted or $C_1$-$C_4$alkyl substituted $C_7$-$C_9$bicycloalkyl;

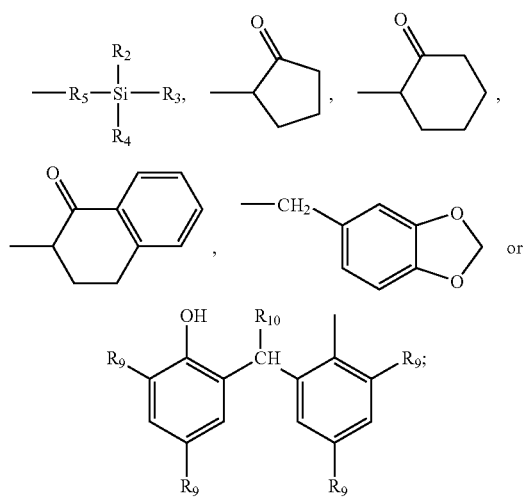

or when $R_7$ is a direct bond, $R_1$ is —CN, —SOR$_8$, —SO$_2$R$_8$, —NO$_2$ or —COR$_8$;

when n is 2, $R_1$ is $C_1$-$C_{18}$alkylene, $C_1$-$C_{18}$alkylene substituted with $C_1$-$C_4$alkyl; $C_2$-$C_{18}$alkylene substituted with $C_1$-$C_4$alkyl and interrupted by oxygen; $C_2$-$C_{18}$alkylene interrupted by oxygen, sulfur, phenylene or cyclohexylene;

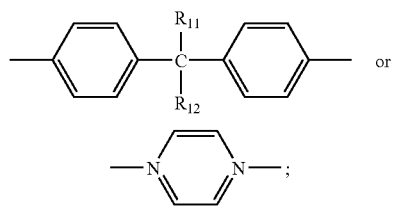

or when $R_6$ and $R_7$ are a direct bond, $R_1$ is

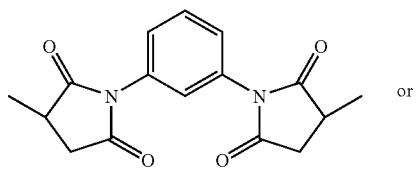

or

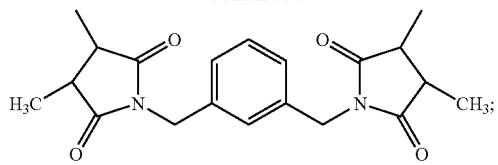

$R_2$, $R_3$ and $R_4$ are each independently of the others $C_1$-$C_{18}$alkyl, $C_2$-$C_{18}$alkyl interrupted by oxygen; $C_5$-$C_8$cycloalkyl, $C_2$-$C_{18}$alkenyl, unsubstituted or $C_1$-$C_4$alkyl-substituted phenyl, $C_7$-$C_9$-phenylalkyl, $C_1$-$C_{18}$alkoxy, $C_3$-$C_{18}$alkoxy interrupted by oxygen; $C_5$-$C_8$cycloalkoxy, $C_2$-$C_{18}$alkenyloxy, unsubstituted or $C_1$-$C_4$alkyl-substituted phenoxy, $C_7$-$C_9$-phenylalkoxy, halogen, $C_2$-$C_{18}$alkanoyloxy or unsubstituted or $C_1$-$C_4$alkyl substituted benzoyloxy; with the proviso that at least one of $R_2$, $R_3$ or $R_4$ is $C_1$-$C_{18}$alkoxy, $C_3$-$C_{18}$alkoxy interrupted by oxygen; $C_5$-$C_8$cycloalkoxy, $C_2$-$C_{18}$alkenyloxy, unsubstituted or $C_1$-$C_4$alkyl-substituted phenoxy, $C_7$-$C_9$-phenylalkoxy, halogen, $C_2$-$C_{18}$alkanoyloxy or unsubstituted or $C_1$-$C_4$alkyl substituted benzoyloxy;

$R_5$ is $C_1$-$C_{18}$alkylene, $C_5$-$C_8$cycloalkylene, unsubstituted or $C_1$-$C_4$alkyl substituted phenylene;

$R_6$ is

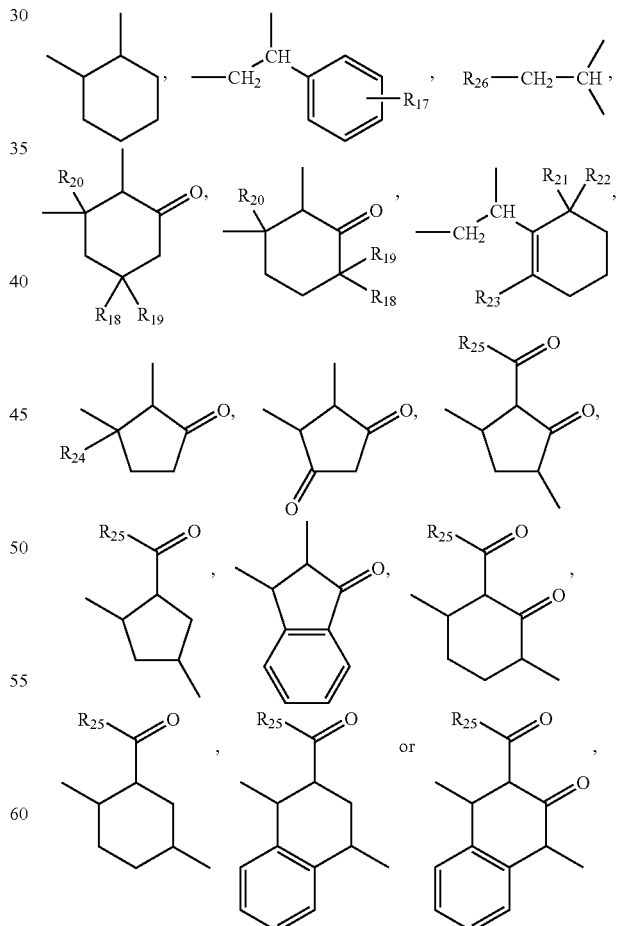

wherein the methylene group is always attached to $R_7$,

R₇ is a direct bond or

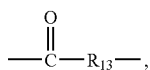

R₈ is $C_1$-$C_{18}$alkyl, $C_2$-$C_{18}$alkyl interrupted by oxygen; $C_5$-$C_8$cycloalkyl, $C_2$-$C_{18}$alkenyl, $C_2$-$C_{18}$alkinyl, $C_7$-$C_9$-phenylalkyl, unsubstituted or $C_1$-$C_4$alkyl-substituted phenyl, R₉ is $C_1$-$C_5$alkyl, R₁₀ is hydrogen or methyl, R₁₁ and R₁₂ are each independently of the other hydrogen, $CF_3$, $C_1$-$C_8$alkyl or phenyl, or R₁₁ and R₁₂, together with the carbon atom to which they are bonded, form a $C_5$-$C_8$cycloalkylidene ring that is unsubstituted or substituted by from 1 to 3 $C_1$-$C_4$alkyl groups, R₁₃ is a direct bond, oxygen or —N(R₁₄)—, R₁₄ is hydrogen or $C_1$-$C_8$alkyl, R₁₇ is hydrogen, halogen, nitro or $C_1$-$C_4$alkoxy, R₁₈ and R₁₉ are each independently of the other hydrogen, $C_1$-$C_{12}$alkyl, $C_3$-$C_{12}$alkenyl or phenyl, R₂₀ is hydrogen or $C_1$-$C_4$alkyl, R₂₁, R₂₂ and R₂₃ are each independently of the other hydrogen or $C_1$-$C_4$alkyl, R₂₄ is hydrogen or $C_1$-$C_4$alkyl, R₂₅ is $C_1$-$C_{12}$alkyl, R₂₆ is hydrogen or $C_1$-$C_4$alkyl, M is sodium, potassium or ammonium, m is 0, 1 or 2; and n is 1 or 2; or an oligomeric hydrolysis product of the compound of the formula I.

Preferred compositions comprise, as component (c), at least a compound of the formula I wherein R₂, R₃ and R₄ are each independently of the others $C_1$-$C_4$alkyl or $C_1$-$C_4$alkoxy; with the proviso that at least one of R₂, R₃ or R₄ is $C_1$-$C_4$alkoxy.

Preference is also given to compositions comprising, as component (c), at least one compound of the formula I wherein R₅ is $C_2$-$C_4$alkylene.

Of very special interest are compositions comprising, as component (c), the compounds 101 to 153.

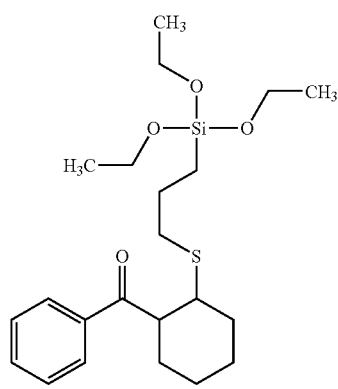

(101)

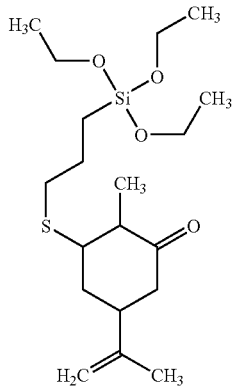

(102)

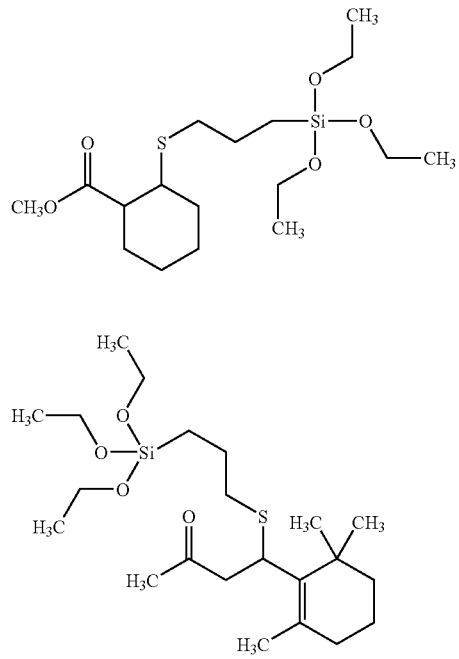

(103) (105)

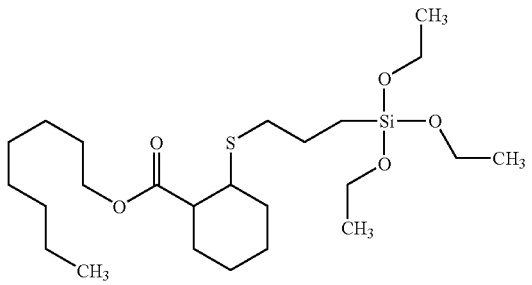

(104)

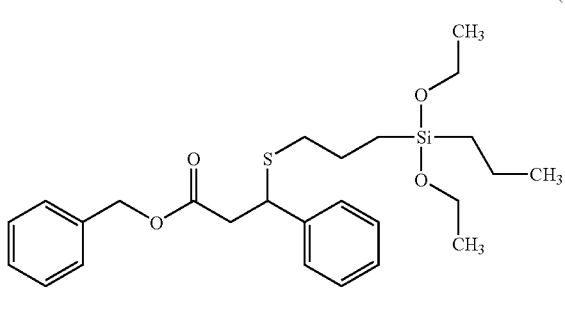

(106)

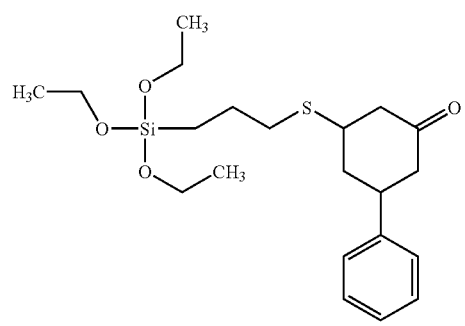
(107)
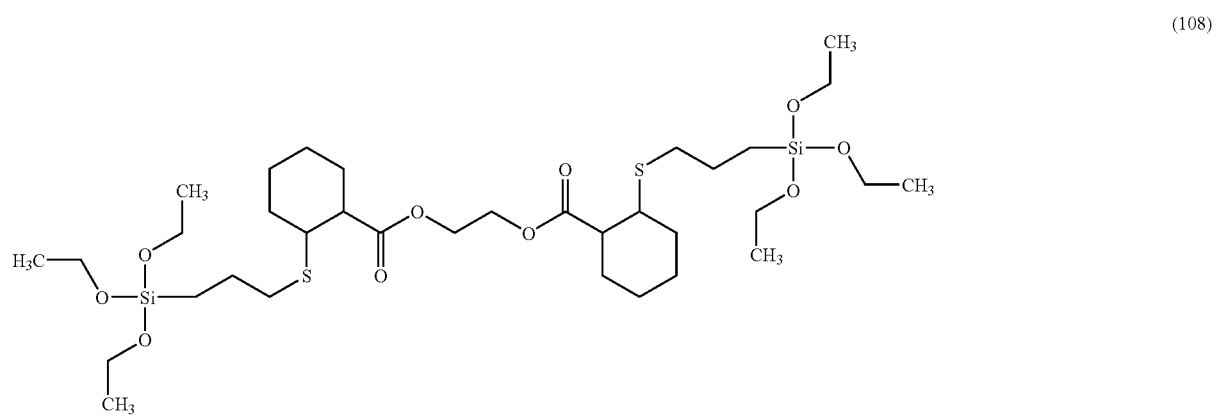
(108)
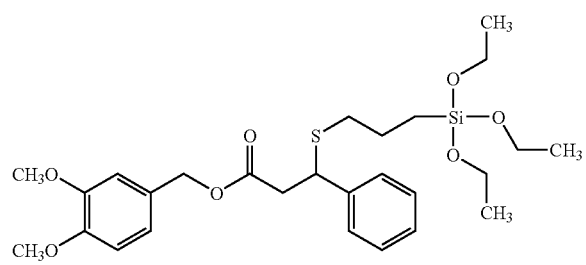
(109)
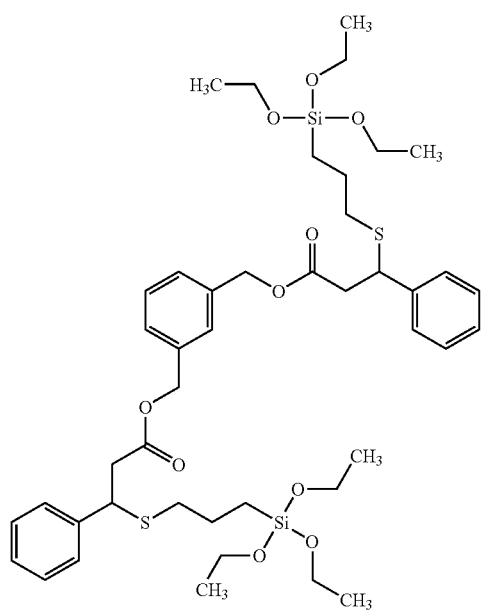
(110)

-continued
(111)
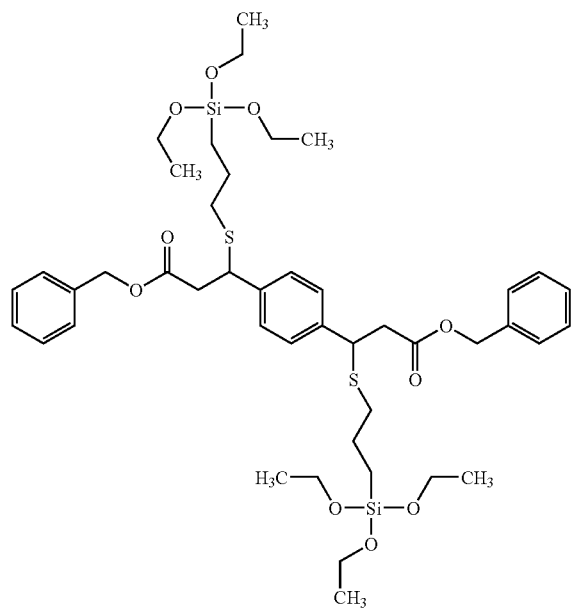
(112)
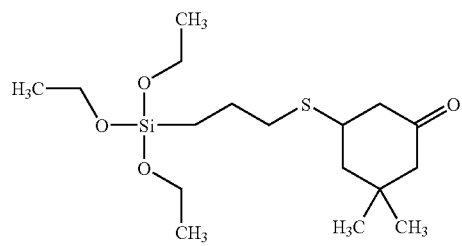
(113)
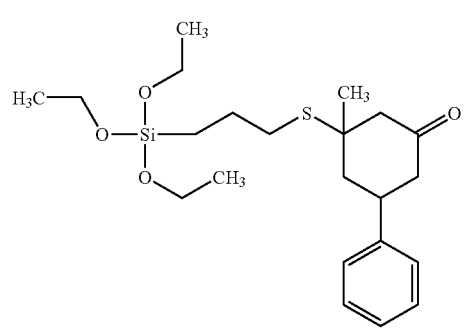
(114)
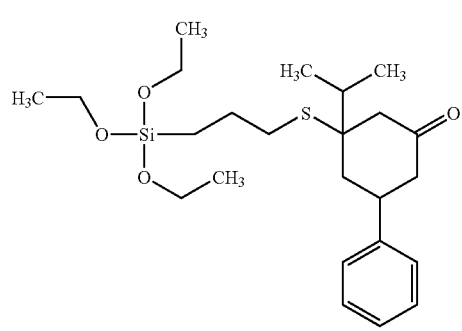
(115)
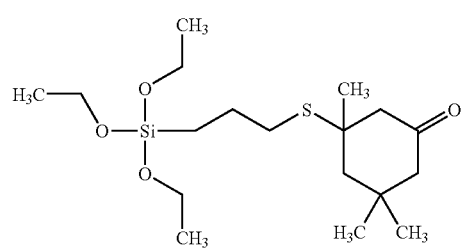
(116)
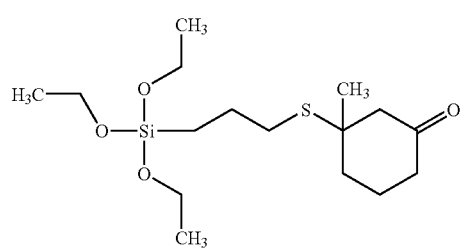
(117)
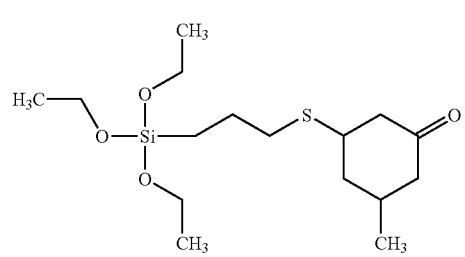
(118)
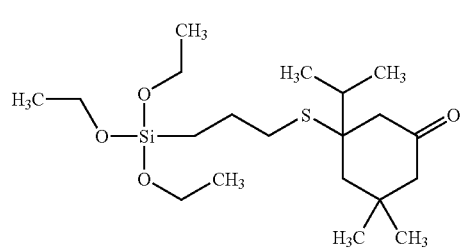

-continued
(119) 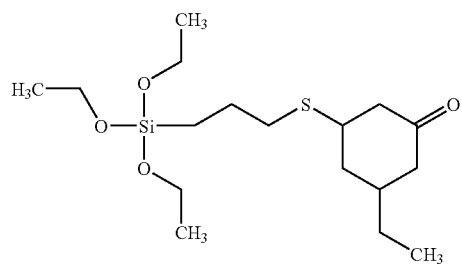
(120) 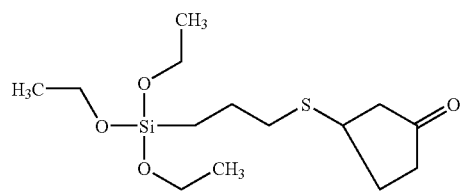
(121) 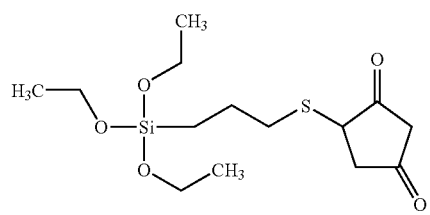
(122) 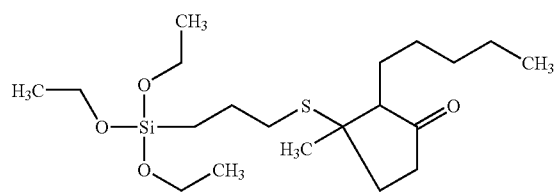
(123) 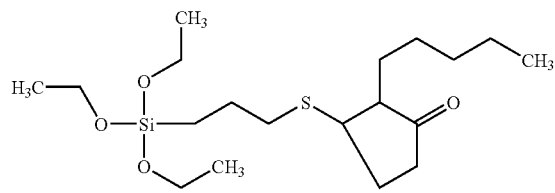
(124)
(125) 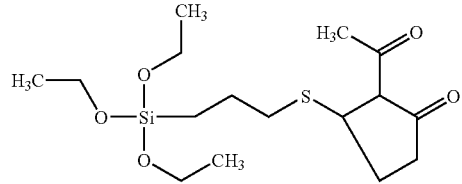
(126)
(127) 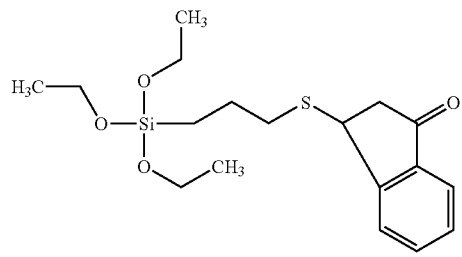
(128)
(129) 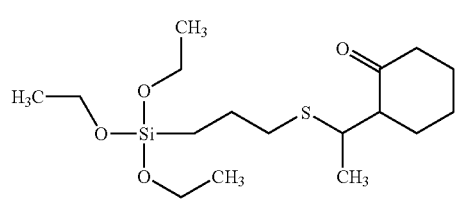
(130)
(131) 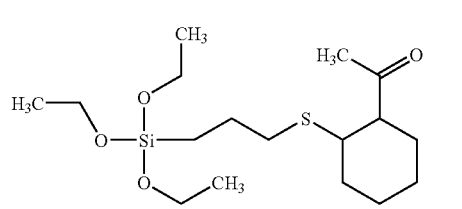
(132) 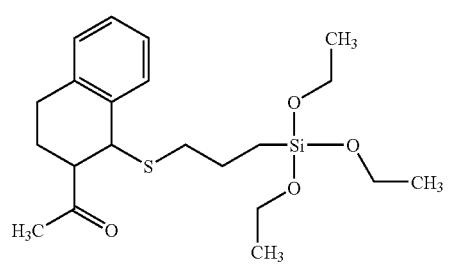

-continued
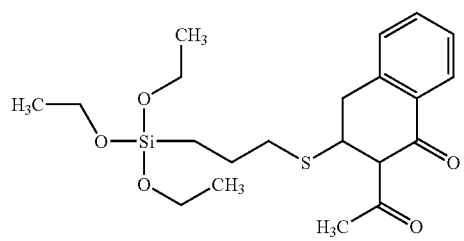
(133)
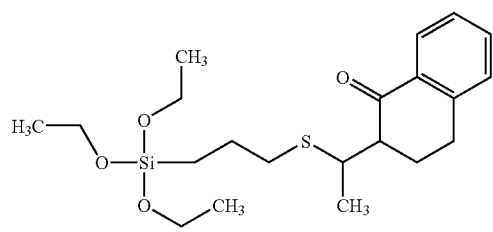
(134)
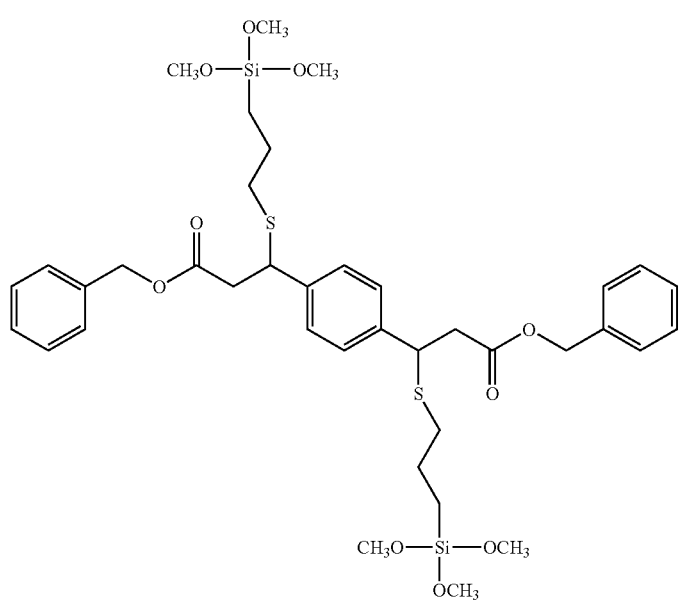
(135)
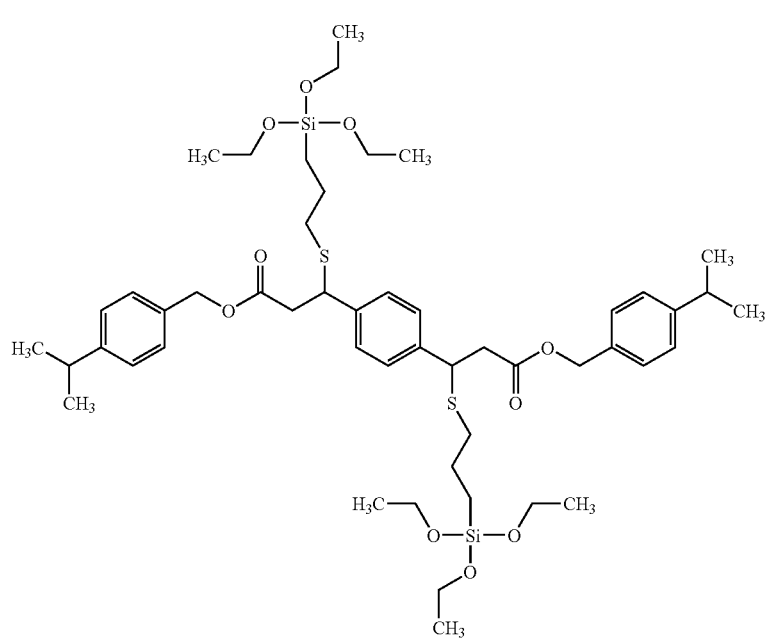
(136)

-continued
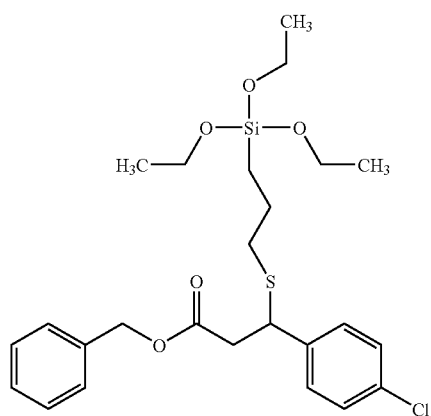
(137)
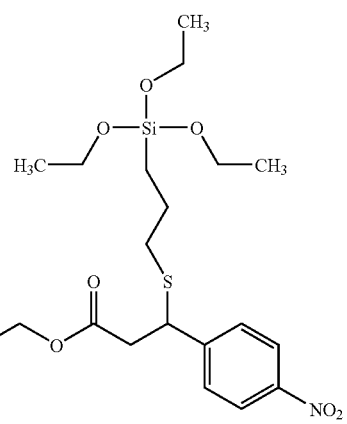
(138)
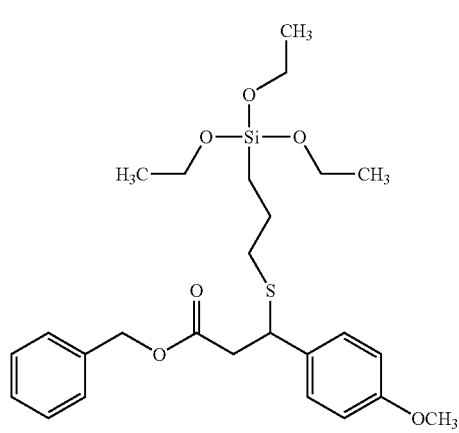
(139)
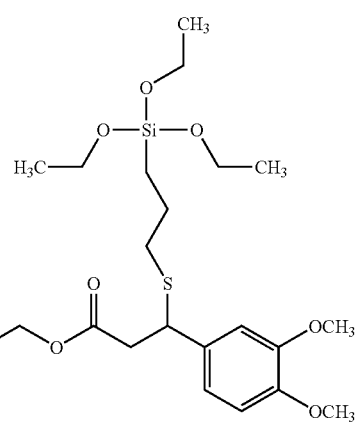
(140)
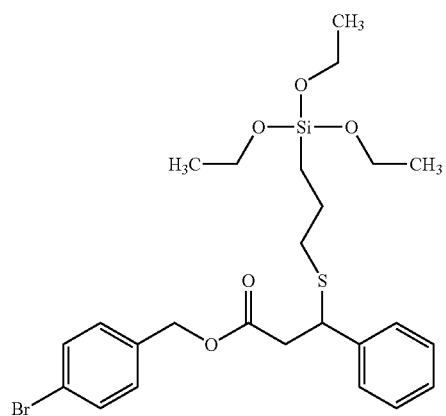
(141)
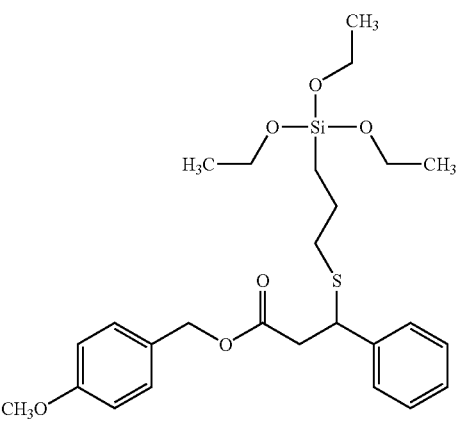
(142)

-continued
(143)
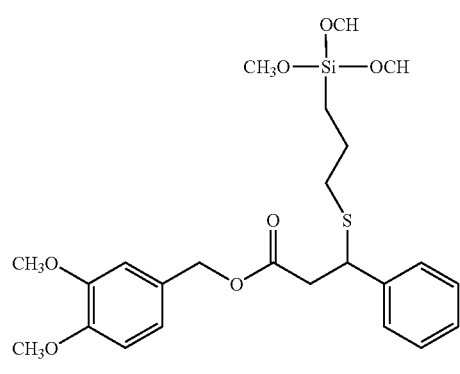
(144)
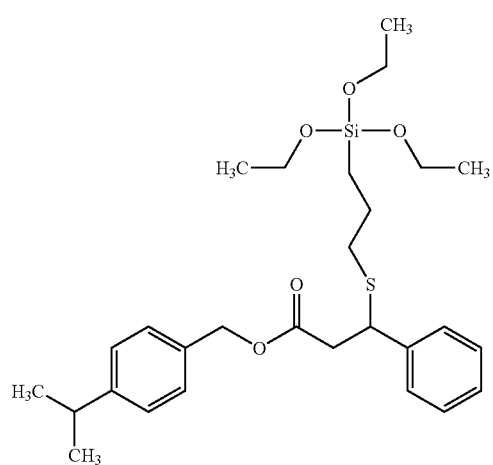
(145)
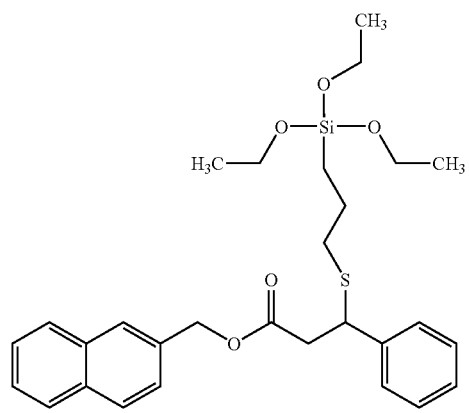
(146)
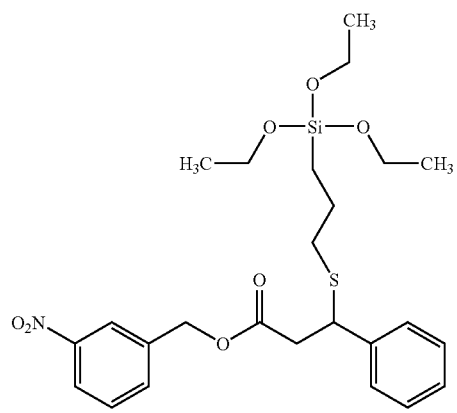
(147)
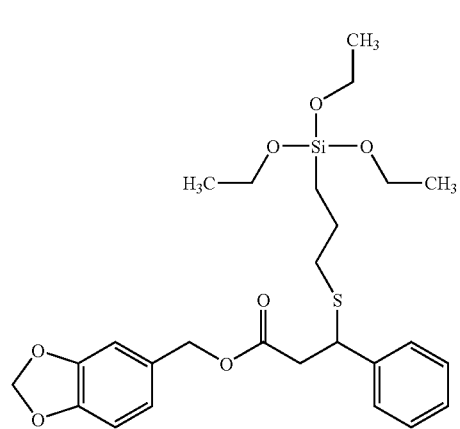
(148)
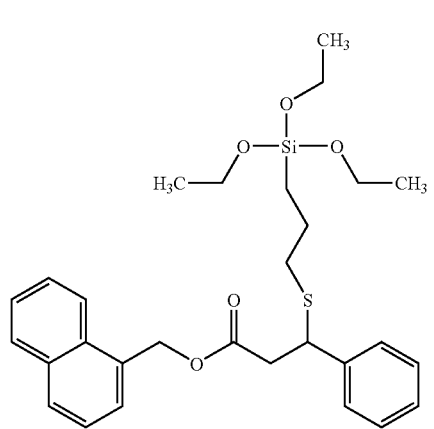

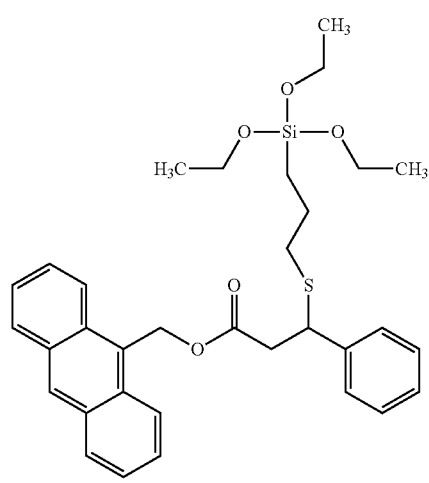
(149)
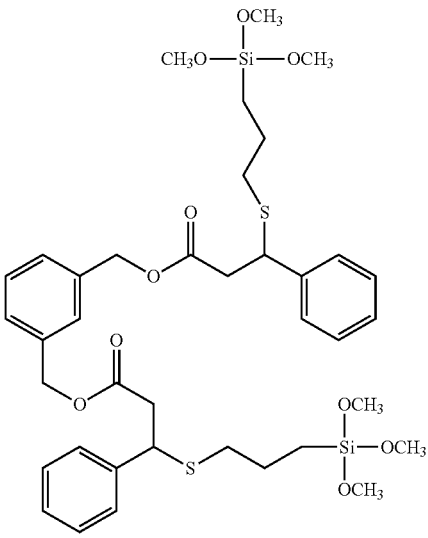
(150)
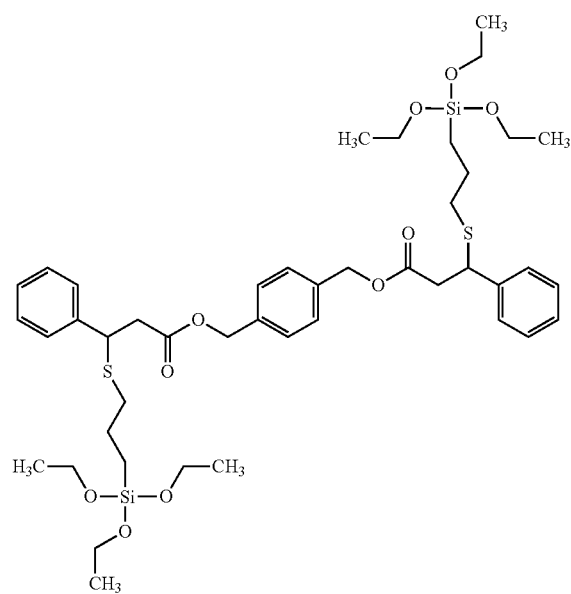
(151)
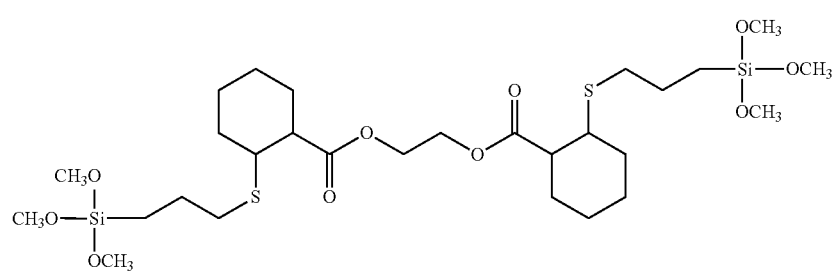
(152)

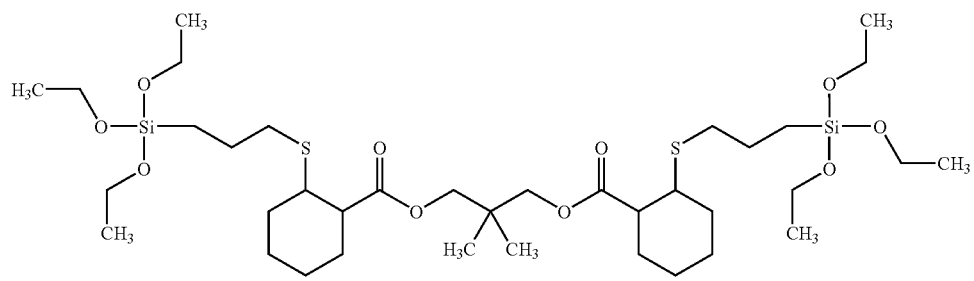

(153)

The compounds of the formula I can be prepared in per se known manner. For example DE-A-1 173 898 discloses the addition of a mercaptan bearing a silylgroup to an activated alkene like acrylates catalyzed by a base. C. D. Hurd, L. L. Gershbein, JACS 69, 2328 (1947) disclose the base-catalyzed addition of mercaptans to acrylic and methacrylic derivatives. B. Boutevin et al., J. Fluor. Chem. 31, 437 (1986) disclose the addition of mercaptans to alkenes by radical activation. The most general method for the preparation of sulfides involves the reaction between an alkylhalogenide and a thiolate anion. The preparation of the compounds of the formula I, wherein m is 1 (sulfoxides) or 2 (sulfones) can be accomplished in per se known matter by, for example, oxidation of the sulfides (m is 0) with an oxidizing reagent such as for example a peroxide. The sulfoxides and sulfones can also be formed insitu while compounding for example a rubber with a filler.

Component (c) is suitable as coupling agent for ensuring the coupling of a white reinforcing filler with a rubber.

Rubbers are to be understood as meaning macromolecular materials which after considerable deformation under a small load at room temperature rapidly regain approximately their original shape. See also Hans-Georg Elias, "An Introduction to Polymer Science", Section 12. "Elastomers", pp. 388-393, 1997, VCH Verlagsgesellschaft mbH, Weinheim, Germany or "Ullmann's Encyclopedia of Industrial Chemistry, fifth, completely revised edition, Volume A 23", pp. 221-440 (1993).

Examples of rubbers which may be present in the compositions of the invention are the following materials:

1. Polymers of diolefins, for example polybutadiene or polyisoprene.

2. Copolymers of mono- and diolefins with one another or with other vinyl monomers, e.g. propylene-isobutylene copolymers, propylene-butadiene copolymers, isobutylene-isoprene copolymers, ethylene-alkyl acrylate copolymers, ethylene-alkyl methacrylate copolymers, ethylene-vinyl acetate copolymers, acrylonitrile-butadiene copolymers, and also terpolymers of ethylene with propylene and with a diene, such as hexadiene, dicyclopentadiene or ethylidenenorbornene.

3. Copolymers of styrene or α-methylstyrene with dienes or with acrylic derivatives, e.g. styrene-butadiene, styrene-butadiene-alkyl acrylate and styrene-butadiene-alkyl methacrylate; block copolymers of styrene, e.g. styrene-butadiene-styrene, styrene-isoprene-styrene and styrene-ethylenebutylene-styrene, and also adhesives prepared from the latter three.

4. Halogen-containing polymers, e.g. polychloroprene, chlorinated rubber, chlorinated or brominated copolymer of isobutylene-isoprene (halobutyl rubber), halogenated copolymers of isobutylene and p-methylstyrene.

5. Natural rubber.

Preferably, the rubber component is based on highly unsaturated rubbers such as, for example, natural rubber and/or styrene-butadiene rubber and/or butadiene rubber. Preferably, natural rubbers are used for production of truck tires. Representative of the highly unsaturated polymers that can be employed in the practice of this invention are diene rubbers. Such rubbers will ordinarily possess an iodine number of between about 20 to about 450, although highly unsaturated rubbers having a higher or a lower (e.g. of 50-100) iodine number can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example styrene, α-methylstyrene, acetylene, e.g. vinyl acetylene, acrylonitrile, methacrylate, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), styrene-isoprene copolymers, isoprene-butadiene copolymers, styrene-isoprene-butadiene tripolymers, polychloroprene, chloro-isobutene-isoprene, nitrile-chloroprene, styrene-chloroprene, and poly(acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

6. Aqueous emulsions of natural or synthetic rubbers, e.g. natural rubber latex or latices of carboxylated styrene-butadiene copolymers.

The rubbers of interest are preferably natural or synthetic rubbers or vulcanizates prepared therefrom. Particular preference is given to polydiene vulcanizates, halogen-containing polydiene vulcanizates, polydiene copolymer vulcanizates, in particular styrene-butadiene copolymer vulcanizates, and ethylene-propylene terpolymer vulcanizates.

In the present application, "reinforcing" white filler is to be understood to mean a white filler capable of reinforcing alone, without any means other than an intermediate coupling agent, a rubber composition intended for the manufacture of tires. In other words the reinforcing white filler is capable of replacing a admixing a conventional carbon black filler in its reinforcing function.

Preferably, the reinforcing white filler is silica ($SiO_2$) or alumina ($Al_2O_3$), or a mixture of these two fillers.

The silica used may be any reinforcing silica known to the person skilled in the art, in particular any precipitated or pyrogenic silica having a BET surface area and a specific CTAB surface area both of which are less than 450 $m^2/g$. The highly dispersable precipitated silicas are preferred, in particular when the invention is used to manufacture tires having a low rolling resistance. "Highly dispersible silica" is understood to mean any silica having a very substantial ability to disagglomerate and to disperse in a polymer matrix, which can be observed in known manner by electron or optical microscopy on thin sections. Non-limiting examples of such preferred highly dispersible silicas, include the silica Perkasil KS 430® from Akzo, the silica BV 3380® from Evonik, the silicas Zeosil 1165 MP® and Zeosil 1115 MP® from Rhône-Poulenc, the silica Hi-Sil 2000® from PPG, the silicas Zeopol 8741® or Zeopol 8745® from Huber, and treated precipitated silicas such as, for example, the aluminium-"doped" silicas described in EP-A-0 735 088.

Preferably, the reinforcing alumina is a highly dispersable alumina having a BET surface area from 30 to 400 m$^2$/g, more preferably 80 to 250 m$^2$/g, an average particle size of at most 500 nm, more preferably at most 200 nm, a high amount of reactive Al—OH surface functions, as described in EP-A-0 810 258. Non-limitative examples of such reinforcing aluminas are in particular the aluminas A125®, CR125® and D65CR® of Baikowski.

The physical state in which the reinforcing white filler is present is immaterial, whether it be in the form of a powder, microbeads, granules or balls. The "reinforcing white filler" is also understood to mean mixtures of different reinforcing white fillers, in particular highly dispersible silicas and/or aluminas such as described above.

The reinforcing white filler may also be used in a blend (mixture) with carbon black. Suitable carbon blacks are all the carbon blacks, in particular carbon blacks of the type HAF, ISAF or conventionally used in tires and, particularly, in treads for tires. Non-limiting examples of such blacks, include th blacks N115, N134, N234, N339, N347 and N375. The quantity of carbon black present in the total reinforcing filler may vary within wide limits, this quantity preferably being less than the quantity of reinforcing white filler present in the composition.

Component (b) is usefully added to the rubber in amounts of from 1 to 40%, for example from 1 to 30%, preferably from 5 to 30%, based on the weight of the rubber.

Component (c) is usefully added to the rubber in amounts of from 0.01 to 10%, for example from 0.1 to 10%, preferably from 0.5 to 5%, based on the weight of the rubber.

In addition to components (a) and (b), the compositions of the invention may comprise further additives, such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3, 5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3, 3-tetramethylbutyl)phenyl]-benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethyl piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergistic compounds, for example thiodipropionic acid dilauryl ester or thiodipropionic acid distearyl ester or compounds of formula IV

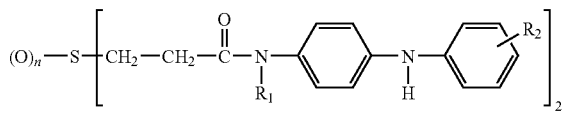

(IV)

wherein
R$_1$ is hydrogen, C$_1$-C$_{12}$alkyl, cyclohexyl, phenyl or benzyl,
R$_2$ is hydrogen or C$_1$-C$_4$alkyl, and
n is the number 0, 1 or 2.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di (benzylidene)sorbitol.

11. Other additives, for example plasticisers, lubricants, emulsifiers, pigments, rheology additives, catalysts, flow-control agents, optical brighteners, flameproofing agents, antistatic agents and blowing agents.

12. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839; EP-A-0591102 or EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethyl phenyl)-5,7-di-tert-butylbenzofuran-2-one, 3-(3,5-dimethyl-4-pivaloyloxyphenyl)-5,7-di-tert-butylbenzofuran-2-one, 3-(3, 4-dimethylphenyl)-5,7-di-tert-butylbenzofuran-2-one, 3-(2, 3-dimethylphenyl)-5,7-di-tert-butylbenzofuran-2-one or 3-(2-actyl-5-isooctylphenyl)-5-isoocylbenzofuran-2-one.

Preferred compositions of the invention comprise, as other additives, one or more components selected from the group consisting of pigments, dyes, levelling assistants, dispersants, plasticizers, vulcanization activators, vulcanization accelerators, vulcanizers, charge control agents, adhesion promoters, light stabilizers or antioxidants, such as phenolic antioxidants (items 1.1 to 1.18 in the list) or aminic antioxidants (item 1.19 in the list), organic phosphites or phosphonites (item 4 in the list) and/or thiosynergists (item 7 in the list).

An example of the concentrations at which these other additives are added is from 0.01 to 10%, based on the total weight of the rubber.

Components (b) and (c), and also, if desired, other additives are incorporated into the rubber by known methods, especially in one-step, for example during mixing in internal mixers with rams (Banburry), on mixing rolls or in mixing extruders, prior to or during shaping, or else by applying dissolved or dispersed components (b) and (c) to the rubber, if desired with subsequent removal of the solvent by evaporation. When added to the rubber, components (b) and (c) and, if desired, other additives may also be in the form of a masterbatch comprising these, for example at a concentration of from 2.5 to 25% by weight.

Components (b) and (c) and, if desired, other additives may also be added prior to or during the polymerization of the rubbers, i.e. advantageously, if desired, as a first-level mixture in the crude rubber, which may also comprise other components, such as carbon black as filler and/or extender oils.

Components (b) and (c) and, if desired, other additives may be in pure form or encapsulated in waxes, in oils or in polymers when they are incorporated into the rubber to be treated.

Components (b) and (c) and, if desired, other additives may also be sprayed onto the rubber to be treated.

The resultant rubbers may be used in a wide variety of forms, e.g. ribbons, moulding compositions, profiles, conveyor belts or tires (pneumatic).

The present invention further provides a process for ensuring the coupling of a white reinforcing filler to rubber compositions reinforced by a white filler, which comprises incorporating into the rubber at least one component (c) and then vulcanizing the composition.

A further embodiment of the present invention is the use of component (b) as coupling agent for ensuring the coupling of a white reinforcing filler with a rubber.

The present invention provides also a process for the manufacture of a filled rubber compound with improved processability which comprises mixing in one-step a) a rubber, b) a white reinforcing filler, and c) a coupling agent of the formula I according to claim 1.

The process of the present invention has the great advantage that the mixing of the three components (a), (b) and (c), and optionally further additives, is possible at a temperature of up to 180° C.

The preferred compounds of the formula I [component (c)] for the process and use listed above are the same as those for the compositions of the invention.

The present invention further provides novel compounds of the formula I $$\left[ R_3 - \underset{\underset{R_4}{|}}{\overset{\overset{R_2}{|}}{Si}} - R_5 - S(O)_m - R_6 - R_7 \right]_n R_1, \quad (I)$$

wherein, when n is 1, $R_1$ is hydrogen, $C_1$-$C_{25}$alkyl, $C_1$-$C_{25}$alkyl substituted with furyl, morpholine, $C_1$-$C_4$dialkylamino, $C_1$-$C_4$trialkylammonium or $M^+$ $^-O_3S$—; $C_2$-$C_{25}$alkyl interrupted by oxygen; $C_5$-$C_{12}$cycloalkyl, $C_2$-$C_{25}$alkenyl, unsubstituted or $C_1$-$C_4$alkyl-substituted phenyl; unsubstituted or with halogen, nitro, $C_1$-$C_4$alkyl or $C_1$-$C_4$alkoxy substituted $C_7$-$C_{15}$arylalkyl; $C_7$-$C_{12}$phenoxyalkyl, unsubstituted or $C_1$-$C_4$alkyl substituted $C_7$-$C_9$bicycloalkyl;

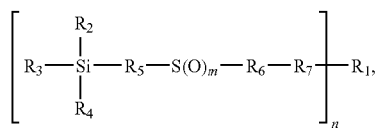

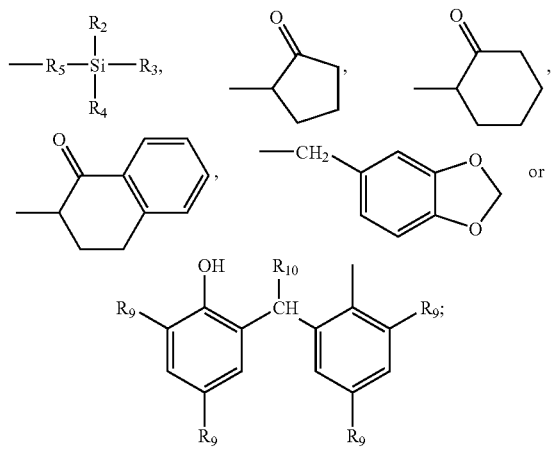

or when $R_7$ is a direct bond, $R_1$ is —CN, —$SOR_8$, —$SO_2R_8$, —$NO_2$ or —$COR_8$;

when n is 2, $R_1$ is $C_1$-$C_{25}$alkylene, $C_1$-$C_{25}$alkylene substituted with $C_1$-$C_4$alkyl; $C_2$-$C_{25}$alkylene substituted with $C_1$-$C_4$alkyl and interrupted by oxygen; $C_2$-$C_{25}$alkylene interrupted by oxygen, sulfur, phenylene or cyclohexylene;

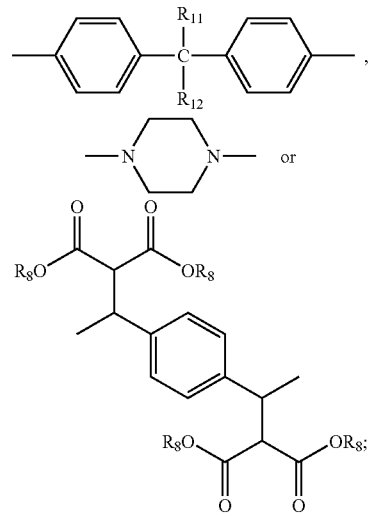

or when $R_6$ and $R_7$ are a direct bond, $R_1$ is

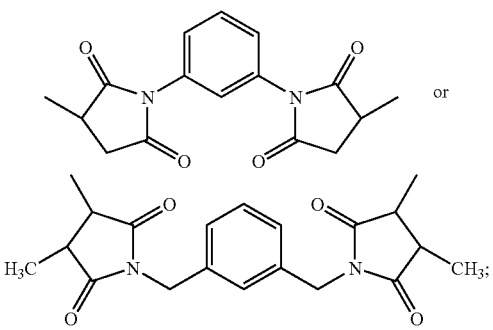

$R_2$, $R_3$ and $R_4$ are each independently of the others $C_1$-$C_{25}$alkyl, $C_2$-$C_{25}$alkyl interrupted by oxygen; $C_5$-$C_{12}$cycloalkyl, $C_2$-$C_{25}$alkenyl, unsubstituted or $C_{1-4}$alkyl-substituted phenyl, $C_7$-$C_9$-phenylalkyl, $C_1$-$C_{25}$alkoxy, $C_3$-$C_{25}$alkoxy interrupted by oxygen; $C_5$-$C_{12}$cycloalkoxy, $C_2$-$C_{25}$alkenyloxy, unsubstituted or $C_1$-$C_4$alkyl-substituted phenoxy, $C_7$-$C_9$-phenylalkoxy, halogen, $C_2$-$C_{25}$alkanoyloxy or unsubstituted or $C_1$-$C_4$alkyl substituted benzoyloxy; or at least two of $R_2$, $R_3$ and $R_4$ are —O—$R_{15}$—O—; or $R_2$ is additionally

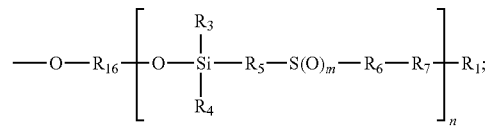

or $R_3$ is additionally

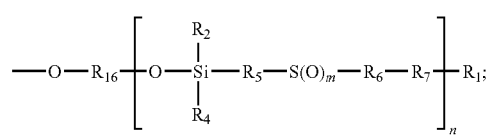

or R$_4$ is additionally

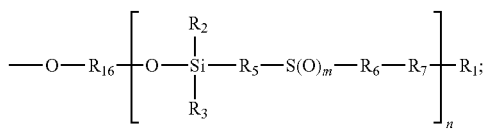

with the proviso that at least one of R$_2$, R$_3$ or R$_4$ is C$_1$-C$_{25}$alkoxy, C$_3$-C$_{25}$alkoxy interrupted by oxygen; C$_5$-C$_{12}$cycloalkoxy, C$_2$-C$_{25}$alkenyloxy, unsubstituted or C$_1$-C$_4$alkyl-substituted phenoxy, C$_7$-C$_9$-phenylalkoxy, halogen, C$_2$-C$_{25}$alkanoyloxy or unsubstituted or C$_1$-C$_4$alkyl substituted benzoyloxy;

R$_5$ is C$_1$-C$_{25}$alkylene, C$_5$-C$_{12}$cycloalkylene, unsubstituted or C$_1$-C$_4$alkyl substituted phenylene;

R$_6$ is

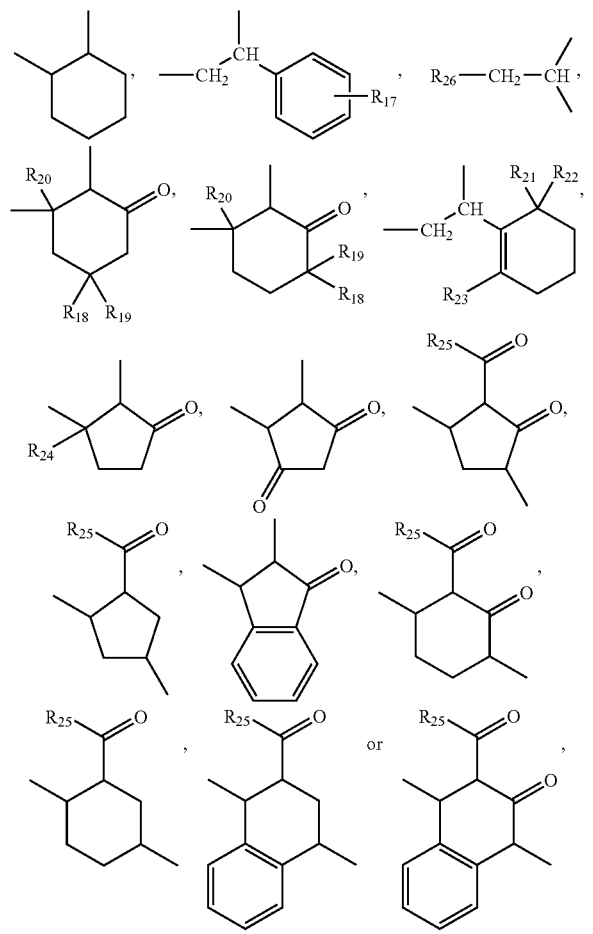

wherein the methylene group is always attached to R$_7$,
R$_7$ is a direct bond or

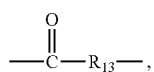

R$_8$ is C$_1$-C$_{25}$alkyl, C$_2$-C$_{25}$alkyl interrupted by oxygen; C$_5$-C$_{12}$cycloalkyl, C$_2$-C$_{25}$alkenyl, C$_2$-C$_{25}$alkinyl, C$_7$-C$_9$-phenylalkyl, unsubstituted or C$_1$-C$_4$alkyl-substituted phenyl, R$_9$ is C$_1$-C$_5$alkyl, R$_{10}$ is hydrogen or C$_1$-C$_4$alkyl, R$_{11}$ and R$_{12}$ are each independently of the other hydrogen, CF$_3$, C$_1$-C$_{12}$alkyl or phenyl, or R$_{11}$ and R$_{12}$, together with the carbon atom to which they are bonded, form a C$_5$-C$_8$cycloalkylidene ring that is unsubstituted or substituted by from 1 to 3 C$_1$-C$_4$alkyl groups, R$_{13}$ is a direct bond, oxygen or —N(R$_{14}$)—, R$_{14}$ is hydrogen or C$_1$-C$_{12}$alkyl, R$_{15}$ is C$_1$-C$_{25}$alkylene or C$_1$-C$_{25}$alkylene substituted with C$_1$-C$_{25}$alkyl;

R$_{16}$ is C$_1$-C$_{25}$alkylene or C$_1$-C$_{25}$alkylene substituted with C$_1$-C$_{25}$alkyl;

R$_{17}$ is hydrogen, halogen, nitro or C$_1$-C$_4$alkoxy,

R$_{18}$ and R$_{19}$ are each independently of the other hydrogen, C$_1$-C$_{12}$alkyl, C$_3$-C$_{12}$alkenyl or phenyl, R$_{20}$ is hydrogen or C$_1$-C$_4$alkyl, R$_{21}$, R$_{22}$ and R$_{23}$ are each independently of the other hydrogen or C$_1$-C$_4$alkyl, R$_{24}$ is hydrogen or C$_1$-C$_4$alkyl, R$_{25}$ is C$_1$-C$_{12}$alkyl, R$_{26}$ is hydrogen or C$_1$-C$_{12}$alkyl, M is sodium, potassium or ammonium, m is 0, 1 or 2; and n is 1 or 2; or an oligomeric hydrolysis product of the compound of the formula I.

The preferred meanings of the general symbols in the novel compounds of the formula Ia are the same as the preferred meanings of the general symbols set out in relation to the compositions of the invention.

The examples below further illustrate the invention. Data in parts or percentages are based on weight.

EXAMPLE 1

Preparation of Compound 101

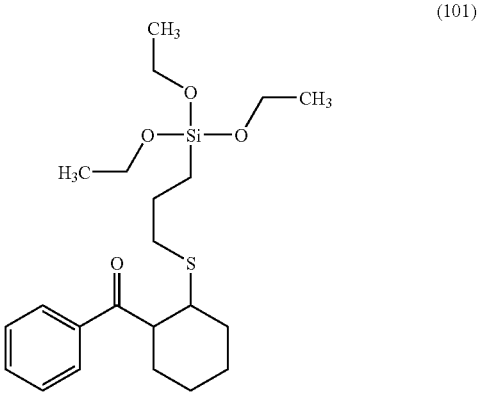

To a suspension of 0.04 g of potassium tert-butanolate in 40 ml of dry toluene is added under nitrogen 8.42 g (35.3 mmol) of 3-mercaptopropyltriethoxysilane, followed by the dropwise addition of 6.57 g (35.3 mmol) of cyclohex-1-enyl-phenyl-methanone keeping the temperature between 25-30° C. The reaction is stirred for 4 hours at room temperature. Ethyl acetate is added and the organic phase is washed two times with brine. The organic layer is dried over sodium sulfate, filtered and concentrated using a vacuum rotary evaporator to give 14.8 g of compound 101, yellow liquid as a mixture of diastereoisomers. $^{13}$C NMR (100 MHz, CDCl$_3$):

δ=202.91 (s, minor diast.); 201.45 (s, major diast.); 137.28 (s, minor diast.); 136.84 (s, major diast.); 132.39 (d, minor diast.); 132.39 (d, major diast.); 128.54 (d); 128.51 (d), 128.26 (d); 128.08 (d); 58.29 (t); 58.25 (t); 50.96 (d, minor diast.); 48.87 (d, major diast.); 45.92 (d, major diast.); 44.58 (d, minor diast.); 35.26 (t); 34.77 (t); 34.44 (t); 32.03 (t); 31.43 (t); 26.17 (t); 25.08 (t); 24.30 (t); 24.13 (t); 23.47 (t); 23.11 (t); 21.75 (t); 18.26 (q); 9.78 (t); 9.71 (t).

EXAMPLE 2

Preparation of Compound 102

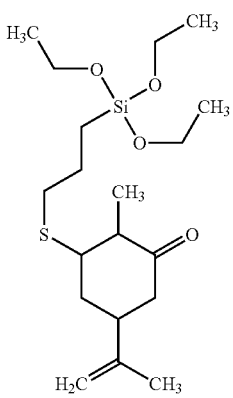

(102)

To a suspension of 0.03 g of potassium tert-butanolate in 20 ml of dry toluene is added under nitrogen 6.13 g (25.7 mmol) of 3-mercaptopropyltriethoxysilane, followed by the dropwise addition of 3.86 g (25.7 mmol) of (R)-(−)-carvone keeping the temperature between 25-30° C. The reaction is stirred for 1 day at room temperature. Ethyl acetate is added and the organic phase is washed two times with brine. The organic layer is dried over sodium sulfate, filtered and concentrated using a vacuum rotary evaporator to give 9.80 g of a colourless liquid. This crude product is purified by distilling off the volatiles in a Kugelrohr oven at 130° C./0.1 mbar to give 7.40 g of the compound 102, colourless liquid as a mixture of diastereoisomers.

EXAMPLE 3

Preparation of Compound 103

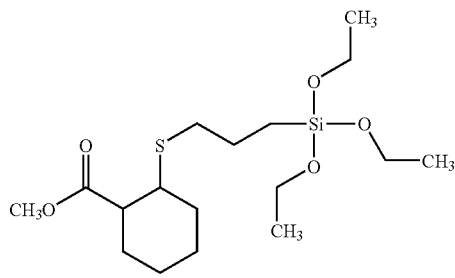

(103)

A mixture of 3.00 g (21.4 mmol) of methyl 1-cyclohexene-1-carboxylate (CAS Registry Number: 18448-47-0), 6.13 g (25.7 mmol) of 3-mercaptopropyltriethoxysilane and 4.44 g (32.1 mmol) of pulverized $K_2CO_3$ in 12 ml of acetonitrile is heated under reflux for 1 day. Ethyl acetate is added and the organic phase is washed repeatedly with water and brine until pH neutral. The organic phase is dried over sodium sulfate, filtered and concentrated using a vacuum rotary evaporator to give 10.2 g of a colourless liquid. This crude product is purified by distilling off the volatiles in a Kugelrohr oven at 120° C./0.1 mbar to give 6.50 g of compound 103, pale yellow liquid. $^1$H NMR (400 MHz, $CDCl_3$): δ=3.81 (q, J=7.2 Hz, $OCH_2CH_3$, 6H); 3.69 (s, $CO_2CH_3$, 3H); 3.35-3.20 (m, $CO_2CH$, 1H), 2.75-2.65 (m, SCH, 1H), 2.60-2.40 (m, $SCH_2CH_2CH_2Si$, 2H); 2.05-1.35 (m, $SCH_2CH_2CH_2Si+CH_2$, 10H); 1.22 (t, J=7.0 Hz, $OCH_2CH_3$, 9H); 0.80-0.65 (m, $SCH_2CH_2CH_2Si$, 2H). $^{13}$C NMR (100 MHz, $CDCl_3$): δ=173.77 (s); 58.35 (t); 51.44 (q); 47.00 (d); 45.42 (d); 35.67 (t); 32.03 (t); 24.42 (t); 24.33 (t); 23.47 (t); 21.62 (t); 18.29 (q); 9.90 (t).

EXAMPLE 4

Preparation of Compound 104

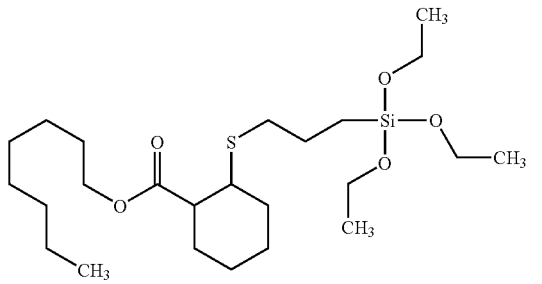

(104)

A mixture of 4.00 g (16.8 mmol) of octyl 1-cyclohexene-1-carboxylate, 4.81 g (20.2 mmol) of 3-mercaptopropyltriethoxysilane and 3.48 g (25.2 mmol) of pulverized $K_2CO_3$ in 16 ml of acetonitrile is heated under reflux for 2 days. Ethyl acetate is added and the organic phase is washed repeatedly with water and brine until pH neutral. The organic phase is dried over sodium sulfate, filtered and concentrated using a vacuum rotary evaporator to give 8.80 g of a pale yellow liquid. The crude product is purified by distilling off the volatiles in a Kugelrohr oven at 160° C./0.1 mbar to give 6.80 g of compound 104, pale yellow liquid. $^1$H NMR (400 MHz, $CDCl_3$): δ=4.20-4.00 (m, $CO_2CH_2$, 2H); 3.82 (q, J=6.8 Hz, $OCH_2CH_3$, 6H); 3.35-3.15 (m, $CO_2CH$, 1H); 2.80-2.45 (m, $SCH+SCH_2CH_2CH_2Si$, 3H); 2.05-1.10 (m, $SCH_2CH_2CH_2Si+CO_2CH_2(CH_2)_6+OCH_2CH_3+CH_2$, 31H); 0.90 (t, J=6.8 Hz, $CH_3$, 3H); 0.80-0.60 (m, $SCH_2CH_2CH_2Si$, 2H). $^{13}$C NMR (100 MHz, $CDCl_3$): δ=173.44 (s); 64.47 (t); 58.36 (t); 47.12 (d); 45.61 (d); 35.83 (t); 32.01 (t); 31.80 (t);

29.23 (t); 28.67 (t); 26.02 (t); 24.55 (t); 24.32 (t); 23.50 (t); 22.64 (t); 21.76 (t); 18.30 (q); 14.09 (q); 9.97 (t).

EXAMPLE 5

Preparation of Compound 105

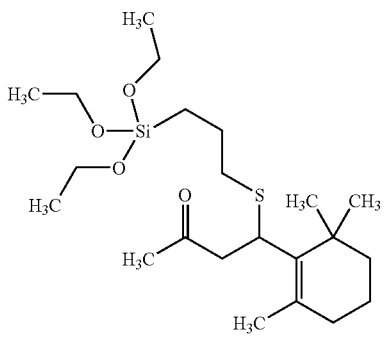
(105)

To 0.46 mmol of a tetrabutylammonium fluoride solution (1M in THF) is added dropwise a solution of 4.46 g (23.2 mmol) of β-ionone and 5.53 g (23.2 mmol) of 3-mercaptopropyltriethoxysilane in 20 ml of tetrahydrofuran. The reaction is stirred for 5 hours at room temperature. Ethyl acetate is added and the organic phase is washed two times with brine. The organic layer is dried over sodium sulfate, filtered and concentrated using a vacuum rotary evaporator to give 10.1 g of a pale yellow liquid. The crude product is purified by distilling off the volatiles in a Kugelrohr oven at 120-160° C./0.1 mbar to give 3.50 g of compound 105, orange liquid. $^{13}$C NMR (100 MHz, CDCl$_3$): δ=206.56 (s); 139.94 (s); 131.47 (s); 58.37 (t); 53.16 (t); 39.72 (t); 38.07 (d); 37.10 (t); 35.79 (s); 33.68 (t); 30.70 (q); 28.32 (q); 27.82 (q); 23.07 (t); 22.34 (q); 19.23 (t); 18.28 (q); 10.12 (t).

EXAMPLE 6

Preparation of Compound 106

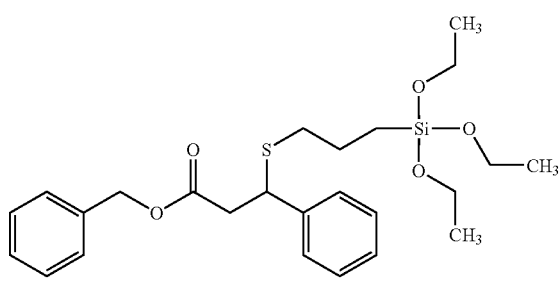
(106)

To a suspension of 0.02 g potassium tert-butanolate in 20 ml of dry toluene is added at 0-5° C. under nitrogen 5.00 g (21.0 mmol) of 3-mercaptopropyltriethoxysilane, followed by the dropwise addition of 5.00 g (21.0 mmol) of benzyl cinnamate keeping the temperature between 0-5° C. The reaction is stirred for 2 hours at room temperature. Ethyl acetate is added and the organic phase is washed with brine. The organic layer is dried over sodium sulfate, filtered and concentrated using a vacuum rotary evaporator to give 10.1 g of compound 106, colourless liquid. $^1$H NMR (400 MHz, CDCl$_3$): δ=7.50-7.15 (m, ArH, 10H); 5.07 (s, ArCH$_2$, 2H); 4.31 (t, J=7.6 Hz, ArCH, 1H); 3.80 (q, J=6.8 Hz; OCH$_2$CH$_3$, 6H); 3.10-2.85 (m, ArCHCH$_2$, 2H); 2.45-2.30 (m, SCH$_2$, 2H); 1.75-1.55 (m, SCH$_2$CH$_2$, 2H); 1.23 (t, J=6.8 Hz; OCH$_2$CH$_3$, 9H); 0.80-0.55 (m, SCH$_2$CH$_2$CH$_2$Si, 2H). $^{13}$C NMR (100 MHz, CDCl$_3$): δ=170.59 (s); 141.39 (s); 135.68 (s); 128.55 (d); 128.50 (d); 128.18 (d); 128.15 (d); 127.70 (d); 127.41 (d); 66.47 (t); 58.36 (t); 45.21 (d); 41.65 (t); 34.37 (t); 22.84 (t); 18.31 (q); 9.95 (t).

EXAMPLE 7

Preparation of Compound 107

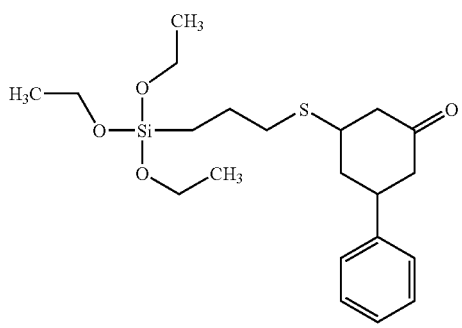
(107)

To a suspension of 0.01 g of potassium tert-butanolate in 20 ml of dry toluene is added at 0-5° C. under nitrogen 1.66 g (6.96 mmol) of 3-mercaptopropyltriethoxysilane. Then 1.20 g (6.96 mmol) of 5-phenyl-cyclohex-2-enone (CAS Registry Number: 35376-41-1) is added dropwise to the reaction keeping the temperature between 0-5° C. The reaction is stirred for 5 hours at room temperature. Ethyl acetate is added and the organic phase is washed two times with brine. The organic layer is dried over sodium sulfate, filtered and concentrated using a vacuum rotary evaporator to give 3.70 g of a colourless liquid. The crude product is purified by distilling off the volatiles in a Kugelrohr oven at 160° C./0.1 mbar to give 2.10 g of compound 107, pale yellow liquid. $^1$H NMR (300 MHz, CDCl$_3$): δ=7.40-7.20 (m, ArH, 5H); 3.80 (q, J=6.9 Hz, OCH$_2$CH$_3$, 6H); 3.65-3.40 (m, SCH+ArCH, 2H); 2.85-2.15 (m, SCH$_2$CH$_2$CH$_2$Si+CH$_2$, 8H); 1.75-1.60 (m, SCH$_2$CH$_2$CH$_2$Si, 2H); 1.21 (t, J=6.9 Hz, OCH$_2$CH$_3$, 9H); 0.80-0.65 (m, SCH$_2$CH$_2$CH$_2$Si, 2H). $^{13}$C NMR (100 MHz, CDCl$_3$): δ=208.23 (s); 143.59 (s); 128.73 (d); 126.83 (d);

126.79 (d); 58.39 (t); 47.80 (t); 46.28 (t); 40.61 (d); 39.07 (d); 37.35 (t); 33.90 (t); 23.07 (t); 18.30 (q); 9.95 (t).

EXAMPLE 8

Preparation of Compound 112

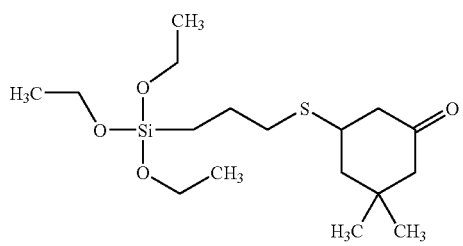

(112)

To a solution of 1.00 g (8.10 mmol) of 5,5-dimethyl-cyclohex-2-enone in 10 ml of dry toluene was added 0.02 g of potassium tert-butanolate at room temperature under nitrogen, followed by 1.93 g (8.10 mmol) of 3-mercaptopropyltriethoxysilane. The reaction is stirred for 18 hours at room temperature. Ethyl acetate is added and the organic phase is washed two times with brine. The organic layer is dried over sodium sulfate, filtered and concentrated using a vacuum rotary evaporator to give 3.70 g of a colourless liquid. The crude product is purified by distilling off the volatiles in a Kugelrohr oven at 90-120° C./0.1 mbar to give 0.80 g of compound 112, colourless liquid. $^1$H NMR (400 MHz, CDCl$_3$): δ=3.83 (q, J=6.8 Hz, OCH$_2$CH$_3$, 6H); 3.10-3.00 (m, SCH, 1H); 2.70-2.55 (m, 3H); 2.30-2.05 (m, 3H); 1.95-1.85 (m, 1H); 1.75-1.55 (m, 3H); 1.24 (t, J=6.8 Hz, OCH$_2$CH$_3$, 9H); 1.10 (s, CH$_3$, 3H); 0.91 (s, CH$_3$, 3H); 0.80-0.65 (m, SCH$_2$CH$_2$CH$_2$Si, 2H). $^{13}$C NMR (100 MHz, CDCl$_3$): δ=209.13 (s); 58.41 (t); 54.13 (t); 48.10 (t); 45.62 (t); 38.95 (d); 35.33 (s); 33.34 (t); 31.82 (q); 25.61 (q); 23.47 (t); 18.32 (q); 9.97 (t).

EXAMPLE 9

Coupling of Silica in a Styrene-Butadiene/Butadiene Rubber

A basic compound containing 103.1 parts of oil extended S-SBR [Buna VSL 5525-1®], 25 parts of BR [Buna CB 24®], 2.5 parts of ZnO, 1.0 part of stearic acid, 80 parts of silica [Ultrasil 7000 GR® from Evonik], 5 parts of a plasticizer [Ingralene 450®], 2 parts of an antiozonant 6PPD [Vulkanox 4020®], 1.5 part of a wax [Antilux 110®] and x parts of the coupling agent of the formula I as indicated in Table 1 are compounded in a laboratory Brabender mixer with cam blades at 160° C. for 6 minutes at a rotor speed of 40 rpm. The temperature of the basic compounds is 190-200° C. The torque required to operate the rotors during mixing as well as the stock temperatures are recorded continuously. The rubber compound is subsequently added on the two roll mill at 90° C. for 4 minutes, then the curing system is added on the two roll mill at 60° C. The curing isotherms are measured at 160° C. with an Oscillating Disc Rheometer (ODR). Rubber samples for testing are compression molded to $t_{95}$ of the Rheometer curve at 160° C.

From these rubber compounds the Mooney viscosity is measured according to ASTM Method D 1646. The value is obtained in a Mooney viscometer. In the viscometer, the material is subjected to shearing forces. The greater the resistance of the material to shear, the higher the Mooney viscosity value. The viscosity value is obtained by using a small rotor (S). MS (1+4) (100° C.) indicates a Mooney viscosity number obtained by using a small rotor after 1 min of pre-heating followed by 4 min of heating at 100° C. The lower the Mooney viscosity values the better. The results are summarized in Table 1.

TABLE 1

| Example | Coupling agent | Mooney viscosity |
|---|---|---|
| 9a[a] | 6.0 phr Si 69[c] | 87 |
| 9b[a] | 5.5 phr Si 75[d] | 76 |
| 9c[a] | 9.7 phr NXT Silane[e] | 59 |
| 9d[b] | 10 phr compound 101 | 57 |
| 9e[b] | 8.2 phr compound 103 | 56 |
| 9f[b] | 10.2 phr compound 104 | 57 |
| 9g[b] | 10.2 phr compound 106 | 50 |

[a] Comparison Example.
[b] Example according to the invention.
[c] Si 69 (RTM) is bis(3-triethoxysilylpropyl)tetrasulfide or TESPT from Evonik.
[d] Si 75 (RTM) is bis(3-triethoxysilylpropyl)disulfide or TESPD from Evonik.
[e] NXT Silane (RTM) is 3-octanoylthio-1-propyltriethoxysilane from GE.

In order to assess the coupling efficiency the following tests have been conducted: Tensile test with ISO S2 dumb-bells (DIN 53 504); Heat build up (Goodrich flexometer) according to ASTM D 623, compression set (recovered height) according to DIN 53 517 and abrasion according to DIN 53516 procedure. The elongation at break and the Young modul at 100% elongation ($E_{100}$) of the tensile test, the sample temperature after the Flexometer test and the recovered height are indications for coupling efficiency. The compounds of the formula I fulfill the high criteria as coupling agents for silica in a styrene-butadiene/butadiene rubber. The results are summarized in Table 2.

TABLE 2

| Example | Coupling agent | Tensile strength (MPa) | $E_{100}$ (MPa) | $E_{300}/E_{100}$ | Compr. Set (3T/23° C.) (%) | Heat build-up (° C.) | Abrasion (mm$^3$) |
|---|---|---|---|---|---|---|---|
| 9h[a] | 6.0 phr Si 69[c] | 19.6 | 3.6 | 4.25 | 9.8 | 114.1 | 113 |
| 9i[a] | 5.5 phr Si 75[d] | 17.5 | 3.4 | 3.59 | 12.2 | 124.9 | 111 |
| 9j[a] | 9.7 phr NXT Silane[e] | 16.3 | 2.7 | 3.7 | 10.9 | — | 115 |
| 9k[b] | 10 phr compound 101 | 17.2 | 3.1 | 3.4 | 11.6 | 130.0 | 83.6 |
| 9l[b] | 9.2 phr compound 102 | 10.9 | 4.4 | — | 10.8 | 137.2 | 67.2 |
| 9m[b] | 10.2 phr compound 104 | 17.3 | 2.6 | 4.4 | 8.7 | — | 138 |

TABLE 2-continued

| Example | Coupling agent | Tensile strength (MPa) | $E_{100}$ (MPa) | $E_{300}/E_{100}$ | Compr. Set (3T/23° C.) (%) | Heat build-up (° C.) | Abrasion (mm$^3$) |
|---|---|---|---|---|---|---|---|
| 9n[b)] | 10 phr compound 105 | 9.6 | 4.6 | — | 12.5 | 154.5 | 83.6 |
| 9o[b)] | 10.2 phr compound 106 | 17.0 | 2.9 | 3.4 | 14.1 | 126.1 | 113 |

Explanation of footnotes
[a)-e)] see end of Table 1.

The $t_{s2}$ values of the curing isotherms (ASTM Method D 2084) indicate the scorch resistance of a rubber compound. S'$_{max}$ is the maximum torque. Scorch safety ($t_{s2}$) is the time to 2 units above minimum torque and cure time ($t_{95}$) is the time to 95% of delta torque above minimum.

The compounds of the formula I fulfill the high criteria as coupling agents with good scorch resistance for silica filled styrene-butadiene/butadiene rubber compounds. The results are summarized in Table 3.

TABLE 3

| Example | Coupling agent | S'$_{max}$ (dNm) | $t_{s2}$ (min) | $t_{95}$ (min) |
|---|---|---|---|---|
| 9p[a)] | 6.0 phr Si 69[c)] | 22.7 | 1.7 | 22.6 |
| 9q[a)] | 5.5 phr Si 75[d)] | 22.6 | 2.2 | 22.9 |
| 9r[a)] | 9.7 phr NXT Silane[e)] | 18.3 | 4.4 | 19.6 |
| 9s[b)] | 10 phr compound 101 | 17.9 | 1.86 | 17.4 |
| 9t[b)] | 8.2 phr compound 103 | 17.6 | 7.61 | 22.7 |
| 9u[b)] | 10.2 phr compound 104 | 14.4 | 5.77 | 22.4 |
| 9v[b)] | 10.2 phr compound 106 | 18.7 | 7.07 | 23.0 |

Explanation of footnotes a)-d) see end of Table 1.

What is claimed is:

1. A composition, comprising:
(a) a naturally occurring or synthetic rubber susceptible to at least one selected from the group consisting of oxidative, thermal, dynamic, light-induced, and ozone-induced degradation;
(b) a white reinforcing filler; and
(c) a coupling agent of formula (I)

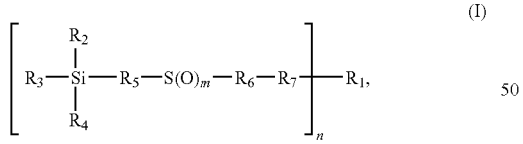

wherein, when n is 1, $R_1$ is hydrogen, $C_1$-$C_{25}$ alkyl, $C_1$-$C_{25}$ alkyl substituted with furyl, $C_1$-$C_{25}$ alkyl substituted with morpholine, $C_1$-$C_{25}$ alkyl substituted with $C_1$-$C_4$ dialkylamino, $C_1$-$C_{25}$ alkyl substituted with $C_1$-$C_4$ trialkylammonium, $C_1$-$C_{25}$ alkyl substituted with M+O3S—, $C_2$-$C_{25}$ alkyl interrupted by oxygen, $C_5$-$C_{12}$ cycloalkyl, $C_2$-$C_{25}$ alkenyl, unsubstituted phenyl, $C_1$-$C_4$ alkyl-substituted phenyl unsubstituted $C_7$-$C_{15}$ arylalkyl, halogen substituted $C_7$-$C_{15}$ arylalkyl, nitro substituted $C_7$-$C_{15}$ arylalkyl, $C_1$-$C_4$ alkyl substituted $C_7$-$C_{15}$ arylalkyl, $C_1$-$C_4$ alkoxy substituted $C_7$-$C_{15}$ arylalkyl, $C_7$-$C_{12}$ phenoxyalkyl, unsubstituted $C_7$-$C_9$ bicycloalkyl, $C_1$-$C_4$ alkyl substituted $C_7$-$C_9$ bicycloalkyl,

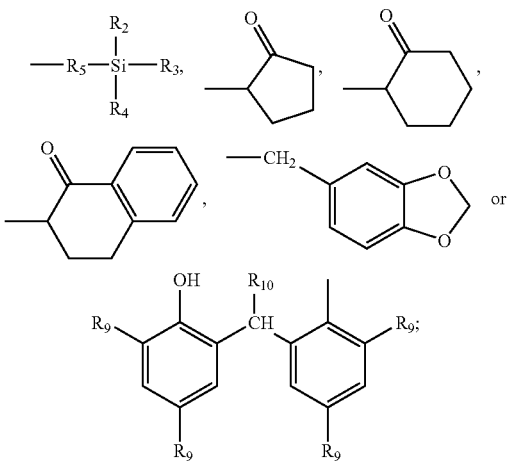

or when $R_7$ is a direct bond, $R_1$ is —CN, —SOR$_8$, —SO$_2$R$_8$, —NO$_2$, or —COR$_8$;

when n is 2, $R_1$ is $C_1$-$C_{25}$ alklene, $C_1$-$C_{25}$ alkylene substituted with $C_1$-$C_4$ alkyl, $C_2$-$C_{25}$ alkylene substituted with $C_1$-$C_4$ alkyl and interrupted by oxygen, $C_2$-$C_{25}$ alkylene interrupted by oxygen, $C_2$-$C_{25}$ alkylene interrupted by sulfur, $C_2$-$C_{25}$ alkylene interrupted by phenylene, $C_2$-$C_{25}$ alkylene interrupted by cyclohexylene,

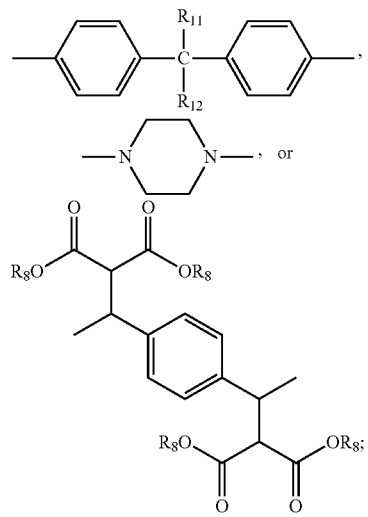

or when $R_6$ and $R_7$ are a direct bond, $R_1$ is

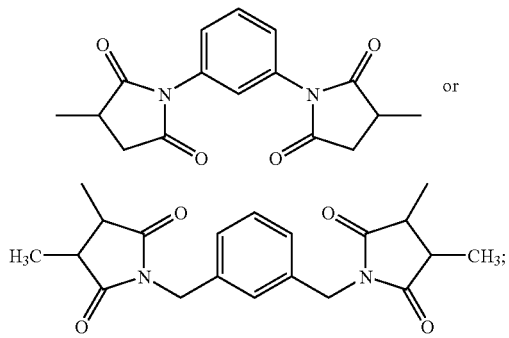

or $R_2$, $R_3$, and $R_4$ are each, independently of the others, $C_1$-$C_{25}$ alkyl, $C_2$-$C_{25}$ alkyl interrupted by oxygen, $C_5$-$C_{12}$ cycloalkyl, $C_2$-$C_{25}$ alkenyl, unsubstituted phenyl, $C_1$-$C_4$ alkyl-substituted phenyl, $C_7$-$C_9$ phenylalkyl, $C_1$-$C_{25}$ alkoxy, $C_3$-$C_{25}$ alkoxy interrupted by oxygen, $C_5$-$C_{12}$ cycloalkoxy, $C_2$-$C_{25}$ alkenyloxy, unsubstituted phenoxy, $C_1$-$C_4$ alkyl substituted phenoxy, $C_7$-$C_9$ phenylalkoxy, halogen, $C_2$-$C_{25}$ alkanoyloxy, unsubstituted benzoyloxy, or $C_1$-$C_4$ alkyl substituted benzoyloxy;

or at least two of $R_2$, $R_3$, and $R_4$ are —O—$R_{15}$—O—;

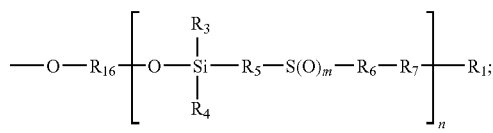

or $R_2$ is additionally

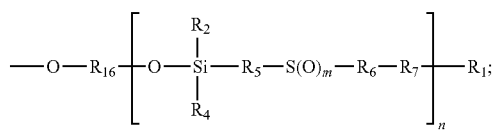

or $R_3$ is additionally

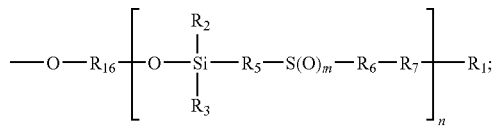

or $R_4$ is additionally with the proviso that at least one of $R_2$, $R_3$, and $R_4$ is $C_1$-$C_{25}$ alkoxy, $C_3$-$C_{25}$ alkoxy interrupted by oxygen, $C_5$-$C_{12}$ cycloalkoxy, $C_2$-$C_{25}$ alkenyloxy, unsubstituted phenoxy, $C_1$-$C_4$ alkyl-substituted phenoxy, $C_7$-$C_9$ phenylalkoxy, halogen, $C_2$-$C_{25}$ alkanoyloxy, or unsubstituted benzoyloxy, or $C_1$-$C_4$ alkyl substituted benzoyloxy;

$R_5$ is $C_1$-$C_{25}$ alkylene, $C_5$-$C_{12}$ cycloalkylene, unsubstituted phenylene, or $C_1$-$C_4$ alkyl substituted phenylene;

$R_6$ is

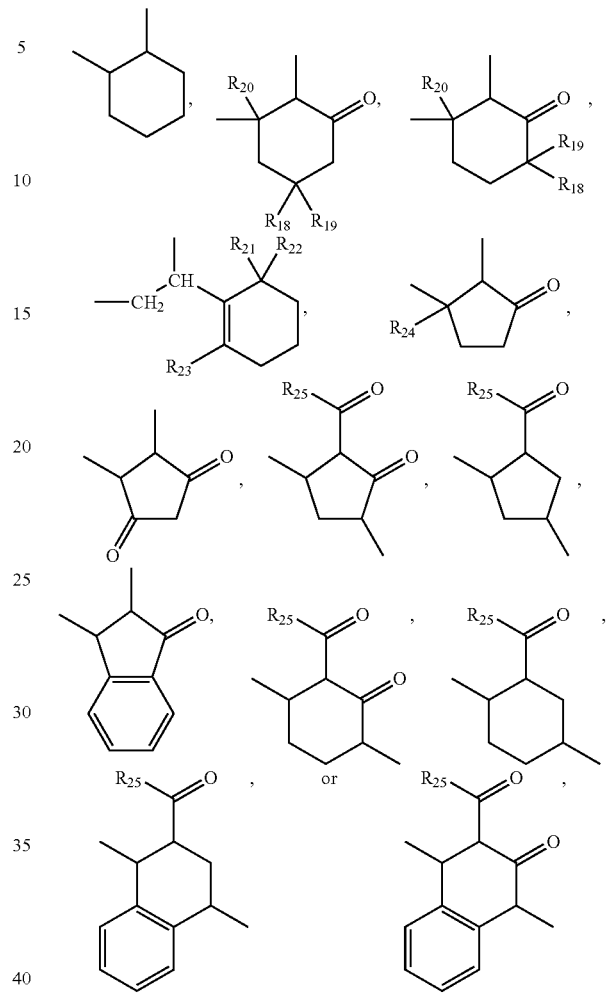

wherein the methylene group is always attached to $R_7$;

$R_7$ is a direct bond or

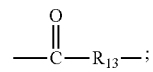

$R_8$ is $C_1$-$C_{25}$ alkyl, $C_2$-$C_{25}$ alkyl interrupted by oxygen, $C_5$-$C_{12}$ cycloalkyl, $C_2$-$C_{25}$ alkenyl, $C_2$-$C_{25}$ alkinyl, $C_7$-$C_9$ phenylalkyl, unsubstituted phenyl, or $C_1$-$C_4$ alkyl substituted phenyl;

$R_9$ is $C_1$-$C_5$ alkyl;

$R_{10}$ is hydrogen or $C_1$-$C_4$ alkyl;

$R_{11}$ and $R_{12}$ are each, independently of the other, hydrogen, $CF_3$, $C_1$-$C_{12}$ alkyl, or phenyl, or $R_{11}$ and $R_{12}$, together with the carbon atom to which they are bonded, form a $C_5$-$C_8$ cycloalkylidene ring that is unsubstituted or substituted by from 1 to 3 $C_1$-$C_4$ alkyl groups;

$R_{13}$ is a direct bond, oxygen, or —N($R_{14}$)—;

$R_{14}$ is hydrogen or $C_1$-$C_{12}$ alkyl;

$R_{15}$ is $C_1$-$C_{25}$ alkylene or $C_1$$C_{25}$ alkylene substituted with $C_1$-$C_{25}$ alkyl;

$R_{16}$ is $C_1$-$C_{25}$ alkylene or $C_1$-$C_{25}$ alkylene substituted with $C_1$-$C_{25}$ alkyl;

$R_{17}$ is hydrogen, halogen, nitro, or $C_1$-$C_4$ alkoxy;

$R_{18}$ and $R_{19}$ are each, independently of the other, hydrogen, $C_1$-$C_{12}$ alkyl, $C_3$-$C_{12}$ alkenyl, or phenyl;

$R_{20}$ is hydrogen or $C_1$-$C_4$ alkyl;

$R_{21}$, $R_{22}$, and $R_{23}$ are each independently of the other, hydrogen or $C_1$-$C_4$ alkyl;

$R_{24}$ is hydrogen or $C_1$-$C_4$ alkyl;

$R_{25}$ is $C_1$-$C_{12}$ alkyl;

$R_{26}$ is hydrogen or $C_1$-$C_{12}$ alkyl;

M is sodium, potassium, or ammonium;

m is 0, 1 or 2; and n is 1 or 2, or an oligomeric hydrolysis product of the compound of formula (I).

2. The composition of claim 1, wherein, when n is 1, $R_1$ is hydrogen, $C_1$-$C_{18}$ alkyl, $C_1$-$C_{18}$ alkyl substituted with furyl, $C_1$-$C_{18}$ alkyl substituted with morpholine, $C_1$-$C_{18}$ alkyl substituted with $C_1$-$C_4$ dialkylamino, $C_1$-$C_{18}$ alkyl substituted with $C_1$-$C_4$ trialkylammonium, $C_1$-$C_{18}$ alkyl substituted with $M^+$ $^-O_3S$—, $C_2$-$C_{18}$ alkyl interrupted by oxygen, $C_5$-$C_8$ cycloalkyl, $C_2$-$C_{18}$ alkenyl, unsubstituted phenyl, $C_1$-$C_4$ alkyl substituted phenyl, unsubstituted $C_7$-$C_{15}$ arylalkyl, halogen substituted $C_7$-$C_{15}$ arylalkyl, nitro substituted $C_7$-$C_{15}$ arylalkyl, $C_1$-$C_4$ alkyl substituted $C_7$-$C_{15}$ aryl-alkyl, $C_1$-$C_4$ alkoxy substituted $C_7$-$C_{15}$ arylalkyl, $C_7$-$C_{12}$ phenoxyalkyl, unsubstituted $C_7$-$C_9$ bicycloalkyl, $C_1$-$C_4$ alkyl substituted $C_7$-$C_9$ bicycloalkyl,

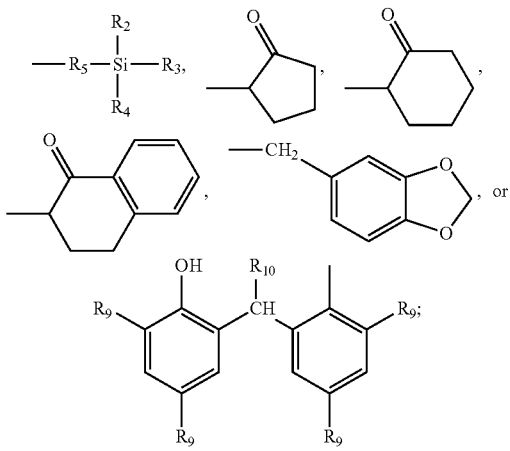

or when $R_7$ is a direct bond, $R_1$ is —CN, —$SOR_8$, —$SO_2R_8$, —$NO_2$, or —$COR_8$;

and wherein, when n is 2, $R_1$ is $C_1$-$C_{18}$ alkylene, $C_1$-$C_{18}$ alkylene substituted with $C_1$-$C_4$ alkyl, $C_2$-$C_{18}$ alkylene substituted with $C_1$-$C_4$ alkyl and interrupted by oxygen, $C_2$-$C_{18}$ alkylene interrupted by oxygen, $C_2$-$C_{18}$ alkylene interrupted by sulfur, $C_2$-C18 alkylene interrupted by phenylene, $C_2$-$C_{18}$ alkylene interrupted by cyclohexylene,

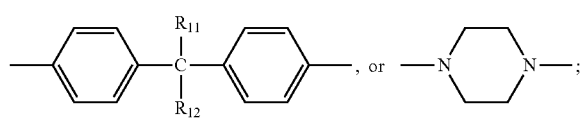

or when $R_6$ and $R_7$ are a direct bond, $R_1$ is

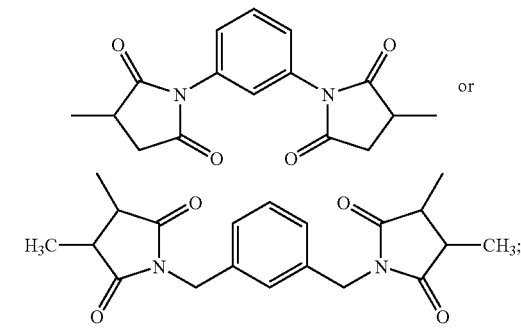

$R_2$, $R_3$, and $R_4$ are each independently of the others, $C_1$-$C_{18}$ alkyl, $C_2$-$C_{18}$ alkyl interrupted by oxygen $C_5$-$C_8$ cycloalkyl, $C_2$-$C_{18}$ alkenyl, unsubstituted phenyl, $C_1$-$C_4$ alkyl substituted phenyl, $C_7$-$C_9$ phenylalkyl, $C_1$-$C_{18}$ alkoxy, $C_3$-$C_{18}$ alkoxy interrupted by oxygen, $C_5$-$C_8$ cycloalkoxy, $C_2$-$C_{18}$ alkenyloxy, unsubstituted phenoxy, $C_1$-$C_4$ alkyl substituted phenoxy, $C_7$-$C_9$ phenylalkoxy, halogen, $C_2$-$C_{18}$ alkanoyloxy unsubstituted benzoyloxy, or $C_1$-$C_4$ alkyl substituted benzoyloxy;

with the proviso that at least one selected from the group consisting of $R_2$, $R_3$ and $R_4$ is $C_1$-$C_{18}$ alkoxy, $C_3$-$C_{18}$ alkoxy interrupted by oxygen, $C_5$-$C_8$ cycloalkoxy, $C_2$-$C_{18}$ alkenyloxy, unsubstituted phenoxy, $C_1$-$C_4$ alkyl substituted phenoxy, $C_7$-$C_9$ phenylalkoxy, halogen, $C_2$-$C_{18}$ alkanoyloxy, unsubstituted or $C_1$-$C_4$ alkyl substituted benzoyloxy;

$R_5$ is $C_1$-$C_{18}$ alkylene, $C_5$-$C_8$ cycloalkylene, unsubstituted phenylene, or $C_1$-$C_4$ alkyl substituted phenylene;

$R_7$ is a direct bond or

$R_8$ is $C_1$-$C_{18}$ alkyl, $C_2$-$C_{18}$ alkyl interrupted by oxygen, $C_5$-$C_8$ cycloalkyl, $C_2$-$C_{18}$ alkenyl, $C_2$-$C_{18}$ alkinyl, $C_7$-$C_9$ phenylalkyl, unsubstituted phenyl, or $C_1$-$C_4$ alkyl substituted phenyl;

$R_{10}$ is hydrogen or methyl;

$R_{11}$ and $R_{12}$ are each, independently of the other, hydrogen, $CF_3$, $C_1$-$C_8$ alkyl, or phenyl;

or $R_{11}$ and $R_{12}$, together with the carbon atom to which they are bonded, form a $C_5$-$C_8$ cycloalkylidene ring that is unsubstituted or substituted by from 1 to 3 $C_1$-$C_4$ alkyl groups;

$R_{14}$ is hydrogen or $C_1$-$C_8$ alkyl; and $R_{26}$ is hydrogen or $C_1$-$C_4$ alkyl, or an oligomeric hydrolysis product of the compound of formula(I).

3. The composition of claim 1, wherein $R_2$, $R_3$, and $R_4$ are each, independently of the others, $C_1$-$C_4$ alkyl or $C_1$-$C_4$ alkoxy;

with the proviso that at least one of $R_2$, $R_3$, and $R_4$ is $C_1$-$C_4$ alkoxy.

4. The composition of claim 1, wherein $R_5$ is $C_2$-$C_4$ alkylene.

5. The composition of claim 1, wherein the component (a) comprises a natural or synthetic rubber or vulcanizate prepared therefrom.

6. The composition of claim 1, wherein the component (a) comprises a polydiene vulcanizate, a halogen-comprising polydiene vulcanizate, a polydiene copolymer vulcanizate, or an ethylene-propylene terpolymer vulcanizate.

7. The composition of claim 1, wherein the component (b) comprises silica or alumina, or a mixture of silica and alumina.

8. The composition of claim 1, wherein the component (b) is present in an amount of 1 to 40% based on the weight of the component (a).

9. The composition of claim 1, wherein the component (c) is present in an amount of 0.01 to 10% based on the weight of the component (a).

10. The composition of claim 1, further comprising:
a further additive.

11. The composition of claim 10, wherein the further additive comprises at least one component selected from the group consisting of a pigment, a dye, a leveling assistant, a dispersant, a plasticizer, a vulcanization activator, a vulcanization accelerator, a vulcanizer, a charge control agent, an adhesion promoter, an antioxidant, and a light stabilizer.

12. The composition of claim 10, wherein the further additive comprises at least one component selected from the group consisting of a phenolic antioxidant, an aminic antioxidant, an organic phosphite, an organic phosphonite, and a thio-synergist.

13. A process for ensuring the coupling of a white reinforcing filler to a rubber composition reinforced by a white filler, the process comprising:
vulcanizing the rubber and at least one component (c) of the composition of claim 1.

14. A process for manufacturing a filled rubber compound, the process comprising:
mixing in one-step
(a) the rubber,
(b) the white reinforcing filler, and
(c) the coupling agent of formula (I),
to obtain the composition of claim 1.

15. A rubber article, comprising the composition of claim 1,
wherein the white reinforcing filler is coupled with the rubber via the component (c).

16. The composition of claim 1, wherein, in the component (c), $R^6$ is

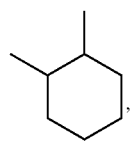

17. The composition of claim 1, wherein, in the component (c), $R^6$ is

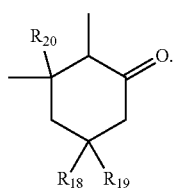

18. The composition of claim 1, wherein, in the component (c), $R^6$ is

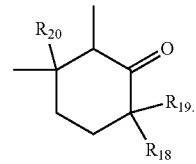

19. The composition of claim 1, wherein, in the component (c), $R^6$ is

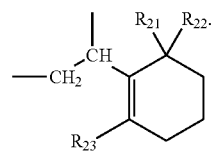

20. A composition, comprising:

(a) a naturally occurring or synthetic rubber susceptible to at least one selected from the group consisting of oxidative, thermal, dynamic, light-induced, and ozone-induced degradation;

(b) a white reinforcing filler; and (c) a coupling agent comprising

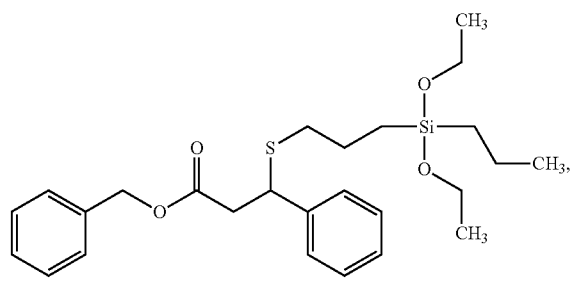

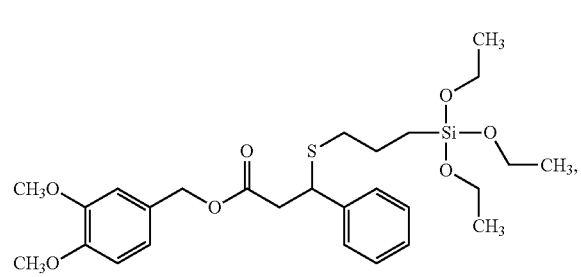

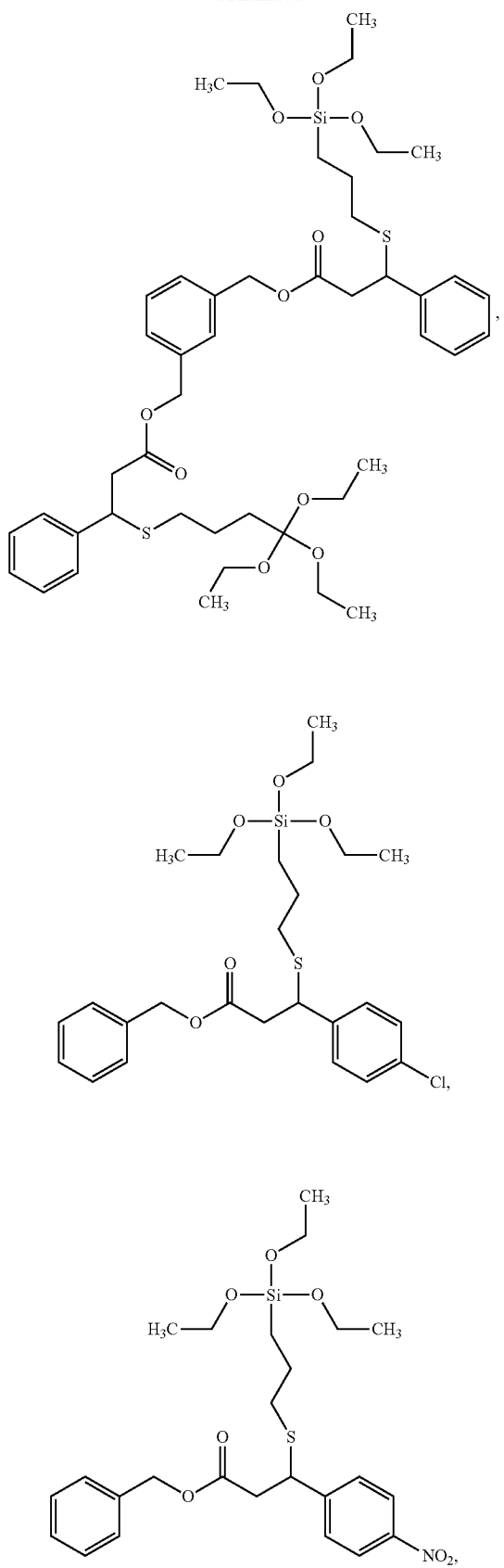
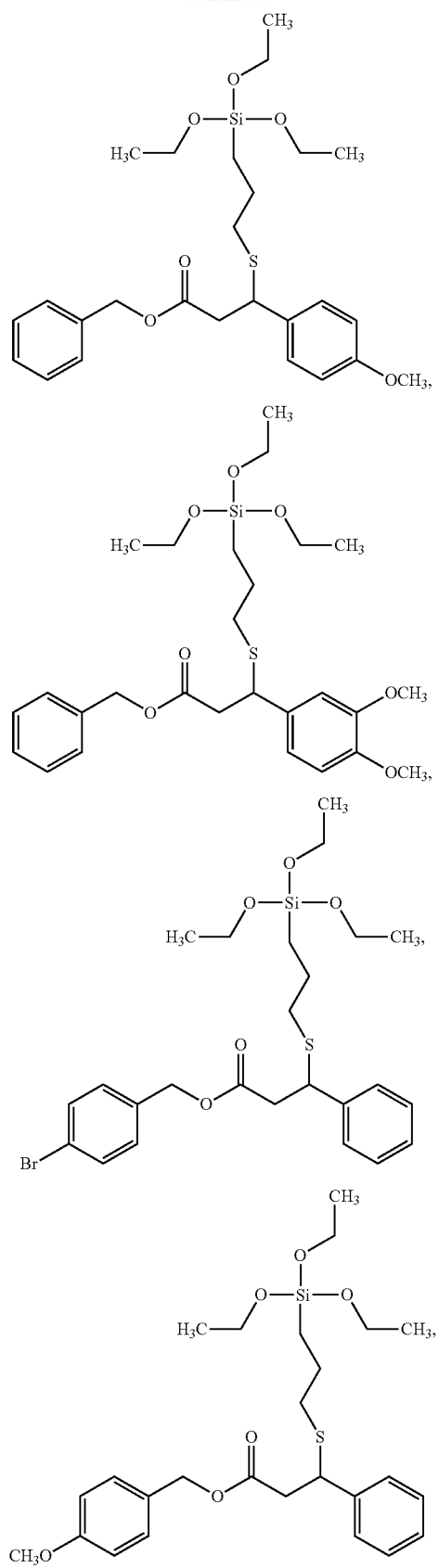

57
-continued
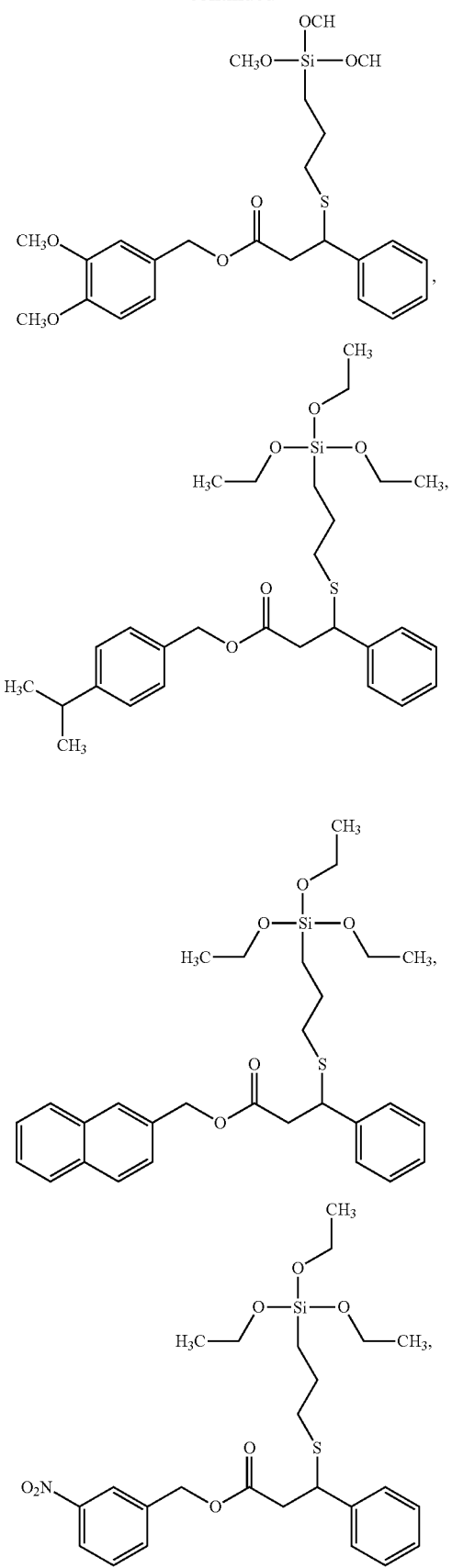
58
-continued
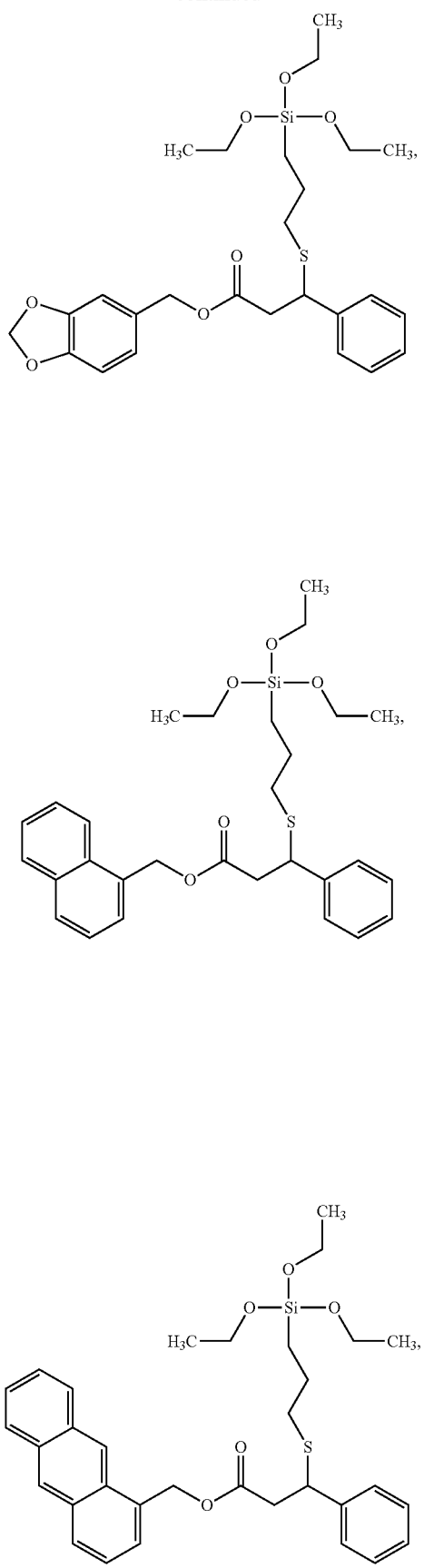

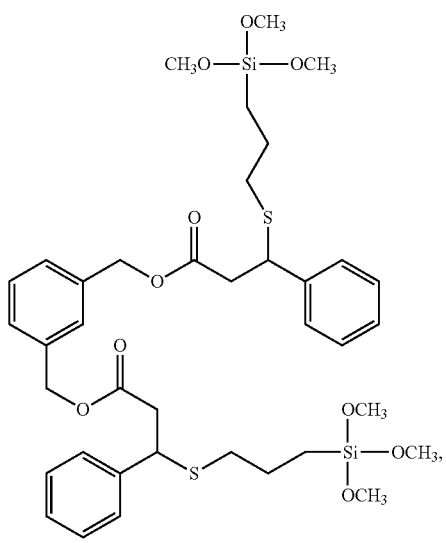
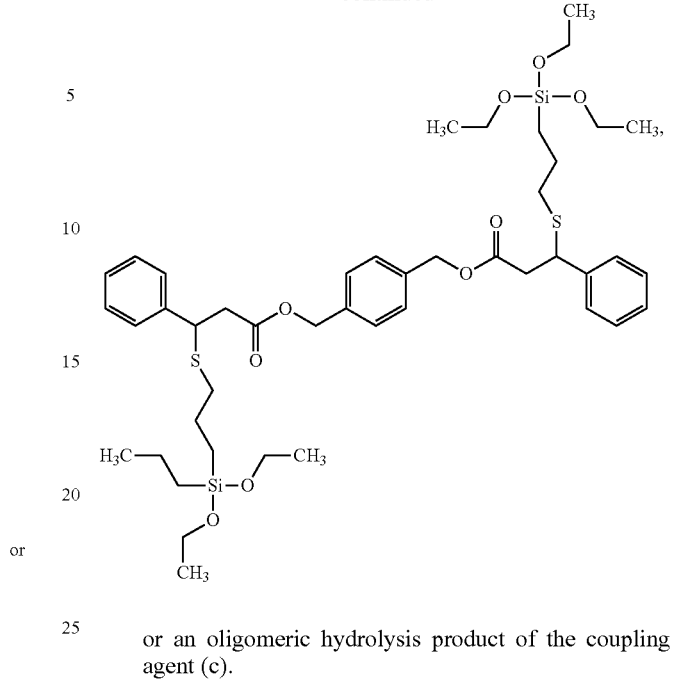
or an oligomeric hydrolysis product of the coupling agent (c).
* * * * *